US011477153B2

(12) United States Patent
Arisada et al.

(10) Patent No.: US 11,477,153 B2
(45) Date of Patent: Oct. 18, 2022

(54) DISPLAY METHOD OF EXCHANGING MESSAGES AMONG USERS IN A GROUP

(71) Applicant: LINE Corporation, Tokyo (JP)

(72) Inventors: Hiroaki Arisada, Tokyo (JP); Tasuku Okuda, Tokyo (JP)

(73) Assignee: LINE Corporation, Tokyo (JP)

( * ) Notice: Subject to any disclaimer, the term of this patent is extended or adjusted under 35 U.S.C. 154(b) by 0 days.

(21) Appl. No.: 16/986,747

(22) Filed: Aug. 6, 2020

(65) Prior Publication Data

US 2020/0366635 A1  Nov. 19, 2020

Related U.S. Application Data

(63) Continuation of application No. 16/692,423, filed on Nov. 22, 2019, now abandoned, which is a (Continued)

(30) Foreign Application Priority Data

Sep. 9, 2016  (JP) .............................. JP2016-176635

(51) Int. Cl.
*H04L 12/58* (2006.01)
*H04M 1/725* (2006.01)
(Continued)

(52) U.S. Cl.
CPC ............ *H04L 51/28* (2013.01); *G06F 3/0488* (2013.01); *G06F 3/04817* (2013.01);
(Continued)

(58) Field of Classification Search
CPC ....... H04L 51/28; H04L 51/046; H04L 51/32; H04M 1/72552; H04M 1/00; H04M 11/00;
(Continued)

(56) References Cited

U.S. PATENT DOCUMENTS 10,523,621 B2 * 12/2019 Arisada ................... H04L 51/28
2004/0015548 A1 * 1/2004 Lee ........................ H04L 65/605
709/204

(Continued)

FOREIGN PATENT DOCUMENTS

CN 103095746 A 5/2013
CN 104144110 A 11/2014
(Continued)

OTHER PUBLICATIONS

International Search Report dated Aug. 8, 2017 issued in International Application No. PCT/JP2017/025426.
(Continued)

*Primary Examiner* — Shirley X Zhang
(74) *Attorney, Agent, or Firm* — Harness, Dickey & Pierce, P.L.C.

(57) ABSTRACT

The display method executed by a terminal including setting a first user name of the first user on the terminal, displaying the first user name and a second user name of the second user in a display area of the terminal based on a first input on the terminal, deleting the displayed second user name from the display area of the terminal based on a second input constituting at least a portion of the set first user name being inputted into the terminal, the displayed second user name being different from the set first user name, based on a second input constituting a part of the first user name, displaying first information representing that a message is destined for the first user, based on a selection of the first user by the user of the terminal, and transmitting the message including the first information to the terminals may be provided.

22 Claims, 19 Drawing Sheets

Related U.S. Application Data continuation of application No. 16/218,924, filed on Dec. 13, 2018, now Pat. No. 10,523,621, which is a continuation of application No. PCT/JP2017/025426, filed on Jul. 12, 2017.

(51) Int. Cl.

| | |
|---|---|
| *G06F 3/04883* | (2022.01) |
| *H04L 51/48* | (2022.01) |
| *G06F 3/0488* | (2022.01) |
| *H04M 11/00* | (2006.01) |
| *G06F 13/00* | (2006.01) |
| *H04M 1/00* | (2006.01) |
| *H04M 3/56* | (2006.01) |
| *H04M 1/72436* | (2021.01) |
| *H04L 51/52* | (2022.01) |
| *G06F 3/04817* | (2022.01) |
| *H04L 51/046* | (2022.01) |

(52) U.S. Cl.
CPC ............ *G06F 13/00* (2013.01); *H04L 51/046* (2013.01); *H04L 51/52* (2022.05); *H04M 1/00* (2013.01); *H04M 1/72436* (2021.01); *H04M 3/56* (2013.01); *H04M 11/00* (2013.01); *H04M 2203/655* (2013.01)

(58) Field of Classification Search
CPC .... H04M 3/56; G06F 3/04817; G06F 3/0488; G06F 13/00
See application file for complete search history.

(56) References Cited

U.S. PATENT DOCUMENTS

| | | | |
|---|---|---|---|
| 2013/0055112 A1 | 2/2013 | Joseph et al. | |
| 2013/0204888 A1 | 8/2013 | Guzman Suarez et al. | |
| 2014/0115070 A1* | 4/2014 | Virtanen | G06Q 10/107 709/206 |
| 2014/0122626 A1* | 5/2014 | Alam | H04L 51/16 709/206 |
| 2014/0289351 A1 | 9/2014 | Chen et al. | |
| 2016/0330160 A1* | 11/2016 | Shan | H04L 65/4076 |
| 2017/0339119 A1* | 11/2017 | Li | H04L 51/24 |
| 2018/0006835 A1 | 1/2018 | Li et al. | |
| 2020/0092247 A1* | 3/2020 | Arisada | H04M 1/576 |

FOREIGN PATENT DOCUMENTS

| | | |
|---|---|---|
| CN | 104205740 A | 12/2014 |
| CN | 104753757 A | 7/2015 |
| JP | 2010-198190 A | 9/2010 |
| JP | 2014-086014 A | 5/2014 |
| JP | 5993277 B2 | 5/2014 |
| JP | 2014-531094 A | 11/2014 |
| KR | 10-2016-0037330 A | 4/2016 |
| KR | 10-2016-0037335 A | 4/2016 |
| KR | 10-2016-0061451 A | 6/2016 |
| WO | WO-2013/060143 A1 | 5/2013 |

OTHER PUBLICATIONS

Imasugu Tsukaeru Kantan mini LINE & Twitter & Facebook Kihon & Benri Waza, 1st Edition, Gijutsu Hyohron Co., Ltd. pp. 15-28 and 81-94 (2014).
Daredemo Dekiru! Office 365 Donyu Guide, 1st Edition, Nikkei Business Publications, Inc., pp. 95-110 (2015).
Office 365 Team Site Katsuyo Guide 2013 edition, 1st edition, Nikkei Business Publications, Inc., pp. 211 (2013).
Mac Fan vol. 23. No. 11, pp. 166 (2015).
Japanese Office Action for Japanese Application No. 2016-176635 dated Jul. 4, 2017.
Slack Kenkyukai "Getting started with Slack: 31 Tips to get familiar with Slack" Personal Media Corporation, Chapter 3, pp. 71-74 (2016) (English translation provided).
Japanese Office Action dated Dec. 18, 2018 issued in corresponding Japanese Application No. 2017-204334.
Korean Office Action dated May 14, 2020 issued in corresponding Korean Patent Application No. 10-2018-7034962.
"Facebook shows automatic synchronization of smartphone photos (android only)," http://ad.itworld.co.kr/RealMedia/ads/click_lx.ads/ITWorld.co.kr/mobile/L20/1752684998/x04/KoreaIDG/200330_Mopub_Nasmedia_Paid_Awareness_APAC_Trendreport_TB/86061.html/6d47504c706c343657436b41426c6c31) (2012) 'I.
"If you know Mention (@), you can be familiar to the social media," http://twtkr.com/winpopup (2011).
Chinese Office Action dated Dec. 27, 2021 issued in corresponding Chinese Patent Application No. 201780036578.4. English translation has been provided.
Chinese Office Action dated Aug. 12, 2021 issued in corresponding Chinese Patent Application No. 201780036578.4. English translation has been provided.
Chinese Office Action dated Apr. 6, 2022 issued in Chinese Patent Application No. 201780036578.4. English translation has been provided.

* cited by examiner

FIG.5

| USER ID | USER ICON | REGISTERED NAME OF USER | DISPLAY NAME OF USER |
|---|---|---|---|
| aaa | 701 | arisada | ARISADA |
| bbb | 702 | ARISA | arisa |
| ccc | 703 | arimi | ARIMI |
| ddd | 704 | tana | TANAKA |

260

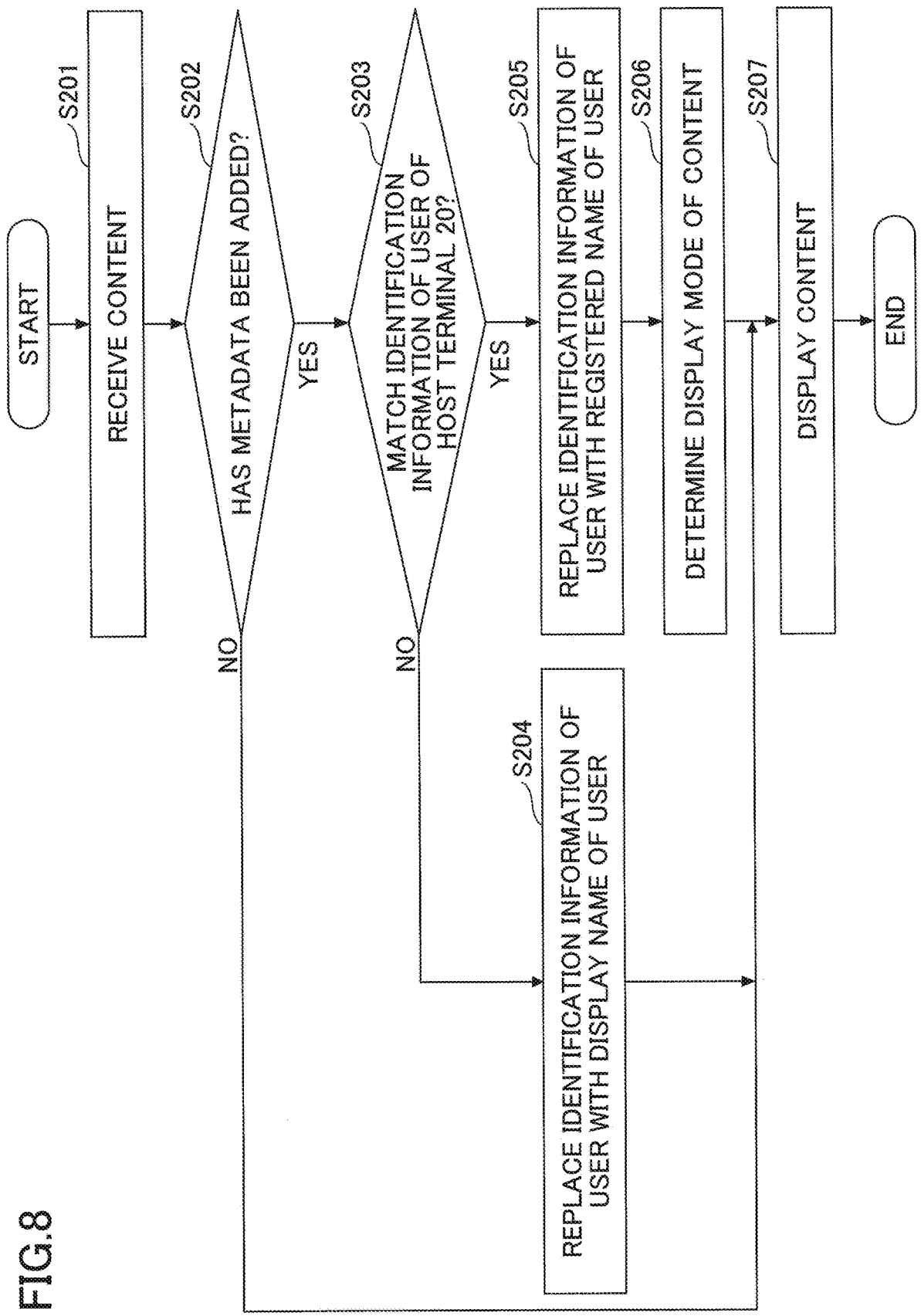

DISPLAY METHOD OF EXCHANGING MESSAGES AMONG USERS IN A GROUP

CROSS-REFERENCE TO RELATED APPLICATIONS

This U.S. non-provisional application is a continuation of U.S. application Ser. No. 16/692,423, filed on Nov. 22, 2019, which is a continuation of U.S. application Ser. No. 16/218, 924, filed on Dec. 13, 2018, now granted as U.S. Pat. No. 10,523,621, issued on Dec. 31, 2019, which is a continuation application of, and claims the benefit of priority under 35 U.S.C. § 365(c) from, International Application PCT/JP2017/025426 filed on Jul. 12, 2017, and designated the U.S., which is based upon and claims the benefit of priority of Japanese Patent Application No. 2016-176635 filed on Sep. 9, 2016, the entire contents of each of which are incorporated herein by reference.

FIELD

The present disclosure relates to non-transitory computer readable recording mediums on which a computer program is recorded, information processing methods, and/or information processing terminals.

BACKGROUND

Conventionally, in a Social Network Service (SNS) (alternatively, referred to as Social Media), a mention function (alternatively, referred to as a comment function) for transmitting a posting while designating a user by whom the sender wants the posting to be viewed.

According to a conventional example of a mention function (alternatively, referred to as a comment function) provided by a messaging service included in an SNS service, when a user name is input following "@", the posting may be notified to a user account of the inputted user name.

However, conventional mention functions does not take into account a case in which contents are being transmitted and received in a group that includes three or more users.

SUMMARY

According to an example embodiment of the present inventive concepts, a display method executed by a terminal that is configured to transmit and receive a message with a plurality of terminals, the plurality of terminals including at least a first terminal of a first user and a second terminal of a second user may be disclosed. The display method may include setting, by using a processor of the terminal, a first user name of the first user on the terminal, displaying by using the processor of the terminal, the set first user name and a second user name of the second user in a display area of the terminal, in response to a first input being inputted into the terminal, deleting by using the processor of the terminal, the displayed second user name from the display area of the terminal based on a second input constituting at least a portion of the set first user name being inputted into the terminal, the displayed second user name being different form the set first user name, displaying, by using the processor of the terminal, first information representing that a first message is directed to the first user, in response to a user of the terminal selecting the first user corresponding to the displayed first user name, and transmitting, by using the processor of the terminal, the first message including the first information to the plurality of terminals.

BRIEF DESCRIPTION OF DRAWINGS

FIG. 5 is a diagram illustrating an example of talk room information;

FIG. 8 is a flowchart illustrating an example of processes executed by a terminal when receiving a mentioned content according to the first example embodiment;

DETAILED DESCRIPTION

<Observance of Confidentiality of Communication>

Note that when implementing the inventive concepts described in this disclosure, it should be implemented with observance of legal matters relating to confidentiality of communication.

Some example embodiments of the present inventive concepts will be described with reference to the drawings.

According to the disclosed example embodiment, it is possible to allow a predetermined (or alternatively desired) user included in a group to view a predetermined (or alternatively desired) content when contents are being transmitted and received in the group that includes multiple users.

<System Configuration>

Figure 1:
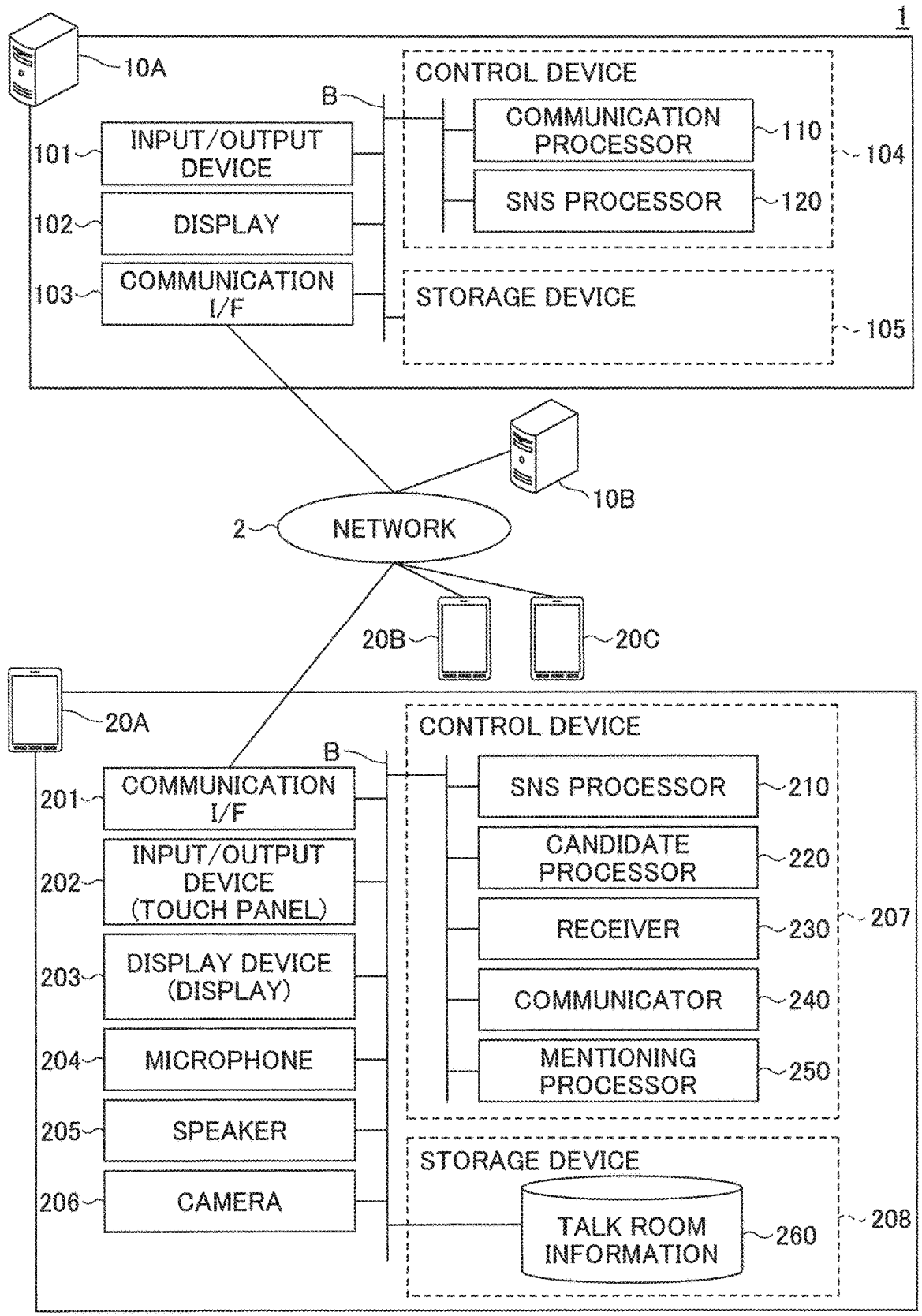
FIG. 1 is a diagram illustrating a configuration of a communication system according to an example embodiment.

FIG. 1 is a diagram illustrating a configuration of a communication system 1 according to an example embodiment. As illustrated in FIG. 1, the communication system has servers 10A and server 10B (collectively referred to as servers 10, or individually referred to as server 10) and terminals terminal 20A, terminal 20B, and terminal 20C (collectively referred to as terminals 20, or individually referred to as terminal 20) connected via a network 2. The server 10 may provide a service for realizing transmission and reception of messages between the terminals 20 owned by a certain user via the network 2. However, the number of terminals 20 connected to the network 2 is not limited.

The network 2 plays a role of connecting one or more terminals 20 with one or more servers 10. In other words, the network 2 refers to a communication network that provides a connection path through which a terminal 20 can transmit and receive data by being connected to a server 10.

For example, one or more portions of the network 2 may be a wired network and/or a wireless network. The network 2 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a part of the Internet, a part of a public switched telephone network (PSTN), a mobile phone network, integrated service digital networks (ISDNs), wireless LANs, long term evolution (LTE), code division multiple access (CDMA), Bluetooth (registered trademark), satellite communication, or one or more combinations thereof. However, in the present invention, the network 2 is not limited thereto. Further, the network 2 may include one or more different types of networks.

The terminal 20 (terminal 20A, terminal 20B, or terminal 20C) may be any terminal as long as it can implement functions described in the example embodiments. The terminal 20 may be a smart phone, a mobile phone (e.g., a feature phone), a computer (e.g., a desktop-type, a laptop-type, or a tablet-type), a media computer platform (e.g., a cable/satellite TV set top box or a digital video recorder), a handheld computing device (e.g., a PDA (personal digital assistant) or an e-mail client), a wearable terminal (a glasses-type device or a watch-type device), or any other type of a computer or a communication platform. However, in the present inventive concepts, the terminal 20 is not limited thereto. The terminal 20 may be expressed as an information processing terminal.

Because configurations of the terminal 20A, the terminal 20B, and the terminal 20C are the same as or substantially similar to each other, in the following description, any of these may be referred to as the terminal 20, and when desired, the terminal 20A may be referred to as the host terminal 20A, the terminal 20B may be referred to as another terminal 20B, and the terminal 20C may be referred to as yet another terminal 20C.

The server 10 has a function of providing a predetermined (or alternatively desired) service to the terminal 20. The server 10 may be any type of information processing apparatus as long as it can implement functions described in the example embodiments. The server 10 may include a server device, and may be implanted by a computer (e.g., a desktop-type, a laptop-type, or a tablet-type), a media computer platform (e.g., a cable/satellite TV set top box or a digital video recorder), a handheld computing device (e.g., a PDA (personal digital assistant) or an e-mail client), or any other type of a computer or a communication platform. However, in the present inventive concepts, the server 10 is not limited thereto. The server 10 may be expressed as an information processing apparatus.

<Hardware (HW) Configuration>

Referring to FIG. 1, HW configuration of each device included in the communication system will be described.

(1) HW Configuration of Terminal

The terminal 20 includes a control device (e.g., CPU (Central Processing Unit)) 207, a storage device 208, a communication I/F (e.g., communication interface) 201, an input/output device 202, a display device 203, a microphone 204, a speaker 205, and a camera 206. The elements of the HW of the terminal 20 are connected to each other, for example, via a bus B.

The communication I/F 201 may transmit and receive various items of data via the network 2. The communication may be executed by wire or by radio, and any communication protocol may be used as long as mutual communication can be executed. The communication I/F 201 may have a function of executing communication with the server 10 via the network 2. The communication I/F 201 may transmit various items of data to the server 10 according to an instruction from the control device 207. Further, the communication I/F 201 may receive various items of data transmitted from the server 10, and transmit the data to the control device 207.

The input/output device 202 may include a device for inputting various operations on the terminal 20 and a device for outputting processing results processed by the terminal 20. The input/output device 202 may include the input device and the output device in an integrated manner, or separately.

The input device may be implemented by any device or a combination of devices that can receive input from the user and can transmit information related to the input to the control device 207. For example, the input device may be implemented by a touch panel that is capable of detecting (1) a contact by a pointer (e.g., a finger of the user or a stylus) and (2) the contact position, and transmitting the coordinates of the contact position to the control device 207. Meanwhile, the input device may be implemented by an input device other than the touch panel. The input device includes, for example, a keyboard, a pointing device (e.g., a mouse), a camera (an operation input of which is moving images), or a microphone (an operation input of which is voice). However, in the present inventive concepts, the input device is not limited to these.

The output device may be implemented by any device or a combination of devices capable of outputting results processed by the control device 207. For example, the output device may be implemented by a touch panel. Meanwhile, the output device may be implemented by an output device other than a touch panel. For example, the output device may include a speaker (an operation output of which is an audio sound), a lens (an operation output of which is a 3D (three dimensional) image or a hologram image), or a printer, and the like may be included. However, in the present inventive concepts, the output device is not limited to these.

The display device 203 may be implemented by any device or a combination of devices that can execute displaying according to display data written in a frame buffer. The display device 203 may include a monitor (e.g., a liquid crystal display or an OELD (organic electroluminescence display)). The display device 203 may be a head-mounted display (HDM). In some example embodiments, the display device 203 may be implemented by a projection mapping device, a hologram device, or a device that is capable of displaying images, text information, and the like in the air or the like (which may be a vacuum). The display devices 203 may be capable of displaying display data in 3D. However, in the present inventive concepts, the display device 203 is not limited to these.

In the case where the input/output device 202 is a touch panel, the input/output device 202 and the display device 203 may have the same or substantially similar size and/or shape to be arranged to face each other.

The control device 207 may be a circuit that is physically structured to execute functions that are implemented by codes or instructions included in a program. The control device 207 may be implemented by, for example, a data processing device built as hardware.

The control device 207 may include a central processing unit (CPU), a microprocessor, a processor core, multiprocessors, an ASIC (application-specific integrated circuit), or an FPGA (field programmable gate array). However, in the present inventive concepts, the control device 207 is not limited to these.

The storage device 208 has a function of storing various programs and/or various items of data for operating the terminal 20. The storage device 208 may be implemented by various storage media such as an HDD (hard disk drive), an SSD (solid state drive), a flash memory, a RAM (random access memory), and/or a ROM (read-only memory). However, in the present inventive concepts, the storage device 208 is not limited to these.

In the terminal 20, a program P is stored in the storage device 208, and the control device 207 running the program P may include respective functional units for executing corresponding processes. In other words, the program P stored in the storage device 208 may realize the functions by being executed by the control device 207 on the terminal 20.

The microphone 204 may be used for inputting audio data. The speaker 205 may be used for outputting audio data. The camera 206 may be used for obtaining data of moving images.

(2) HW Configuration of Server

The server 10 may include a control device (CPU) 104, a storage device 105, a communication I/F (interface) 103, an input/output device 101, and a display 102. The elements of the HW of the server 10 may be connected, for example, via a bus B.

The control device 104 may have a circuit that is physically structured to execute functions that are implemented by codes or instructions included in a program. The control device 104 may be implemented by, for example, a data processing device built as hardware.

The control device 104 may be a central processing unit (CPU), a microprocessor, a processor core, multiprocessors, an ASIC, or an FPGA. However, in the present inventive concepts, the control device 104 is not limited thereto.

The storage device 105 may have a function of storing various programs and various items of data for operating the server 10. The storage device 105 may be implemented by various storage media such as an HDD, an SSD, or a flash memory. However, in the present inventive concepts, the storage device 105 is not limited to these.

The communication I/F 103 may transmit and receive various items of data via the network 2. The communication may be executed by wire or by radio, and any communication protocol may be used as long as mutual communication can be executed. The communication I/F 103 may have a function of executing communication with the terminal 20 via the network 2. The communication I/F 103 may transmit various items of data to the terminal 20 according to an instruction from the control device 104. Further, the communication I/F 103 may receive various items of data transmitted from the terminal 20, and transmit the data to the control device 104.

The input/output device 101 may be implemented by a device (or devices) that inputs various operations on the server 10. The input/output device 101 may be implemented by any one of devices or a combination of devices that can receive input from the user and can transmit information related to the input to the control device 104. The input/output device 101 may be implemented by hardware keys (e.g., a keyboard) or a pointing device (e.g., a mouse). Note that the input/output device 101 may include, for example, a touch panel, a camera (an operation input of which is a still or moving image), and a microphone (an operation input of which is voice). However, in the present inventive concepts, the input/output device 101 is not limited thereto.

The display 102 may be implemented by a monitor (e.g., a liquid crystal display or an OELD (organic electroluminescence display)). In some example embodiments, the display 102 may be a head-mounted display (HDM). The display 102 may be a device that is capable of displaying display data in 3D. However, in the present inventive concepts, the display 102 is not limited thereto.

In the server 10, the program P may be stored in the storage device 105, and the control device 104 running this program P may include functional units that are capable of executing processes corresponding thereto. In other words, the program P stored in the storage device 105 may realize the functions by being executed by the control device 104 on the server 10.

The example embodiment in the present disclosure will be described assuming that one or more display method are implemented by the CPU(s) of the terminal 20 and/or the server 10 executing the program P.

The control device 207 of the terminal 20 and/or the control device 104 of the server 10 may be implemented not only by a CPU but also by a logic circuit (hardware) or a dedicated circuit in a form of an integrated circuit (IC) chip or an LSI (Large Scale Integration) chip. The circuits may be implemented by one or more integrated circuits, and multiple processes described in the example embodiments may be implemented by a single integrated circuit. An LSI may also be referred to as a VLSI, a super LSI, an ultra LSI, or the like depending on the degree of integration.

Also, the program P (software program/computer program) of the example embodiments in the present disclosure may be provided in a state stored in a computer-readable recording medium. The recording medium can store the program in a "non-transitory computer-readable tangible medium".

When appropriate, the recording medium may include one or more semiconductor-based or other integrated circuits (ICs) such as field programmable gate arrays (FPGAs) or application specific integrated circuits (ASICs); a hard disk drive (HDD), a hybrid hard drive (HHD), an optical disk, an optical disk drive (ODD), a magneto-optical disk, a magneto-optical drive, a floppy diskette, a floppy disk drive (FDD), a magnetic tape, a solid state drive (SSD), a RAM drive, a secure digital card or drive, any other suitable recording medium, or any suitable combination of two or more of these. When appropriate, the recording medium may be volatile, non-volatile, or may have a combination of volatility and non-volatility. Note that the recording medium is not limited to these examples, and may be any device or medium as long as it can store the program P.

The server 10 and/or the terminal 20, for example, can read the program P stored in the recording medium and execute the read program P to realize the functions of multiple functional units described in the disclosed example embodiment.

Also, the program P in the present disclosure may be provided to the server 10 or the terminal 20 via any transmission medium (e.g., a communication network or a broadcasting wave) that is capable of transmitting the program P. The server 10 and/or the terminal 20 may realize functions of multiple functional units described in the disclosed example embodiments by executing the program P downloaded via, for example, the Internet.

Some example embodiment of the present inventive concepts can also be implemented in a form of a data signal embedded in a carrier wave in which the program P is embodied by electronic transmission. The program in the present disclosure can be implemented by using a script language (e.g., ActionScript or JavaScript (registered trademark)), an object-oriented programming language (e.g., Objective-C or Java (registered trademark)) and a markup language (e.g., HTML5). However, the present inventive concepts is not limited thereto.

First Example Embodiment

The first example embodiment has a form in which multiple users in a talk room perform mentioning to transmit contents.

Here, the talk room may be provided as a service menu by an SNS generated for exchanging contents (e.g., messages, stamps, still images, or moving images) among users of the SNS. In the talk room, multiple users may be registered. The talk room may be referred to as a chat group or as a talk information session.

Also, "mentioning" means adding information to a predetermined (or alternatively desired) content, more particularly adding the information by a user included in the talk room, and designating the information to another user included in the talk room and wanted by the one user to visually recognize the content with relative ease.

Also, the mentioned content means the content as to which a destination user (or alternatively, referred to as an intended user throughout this disclosure) is designated by the one user.

The matter described in the first example embodiment can be applied to any of the other example embodiments.

<Functional Configuration>
(1) Functional Configuration of Terminal

A functional configuration of the terminal 20 will be described by using FIG. 1. The terminal 20 may include functional units (or may be implemented by hardware components) such as an SNS processor 210, a candidate processor 220, a receiver 230, a communicator 240, and a mention processor 250. These functions are implemented by reading and executing one or more programs stored in the storage device 208 by the control device 207.

The SNS processor 210 may execute various processes that use the messaging service of the SNS provided by the server 10. For example, in a talk room, the SNS processor 210 may transmit and receive contents (e.g., character string messages, stamps, or images), with other terminals 20 via the server 10. In this talk room, transmitted and received contents may be displayed in order of transmission and reception (so as to be arranged in chronological order). For example, an older content may be displayed on the upper part of the screen and a newer content may be displayed on the lower part of the screen. When content is transmitted and received, for example, the content may be displayed in association with a user icon that represents a user as the transmitter of the content.

The candidate processor 220 may search for candidates for the destination user of a mention from among the users included in the talk room, and display the found candidates on the screen of the talk room.

The receiver 230 may receive an operation from the user. The receiver 230 may receive, for example, an operation to select a user as the destination user of the mention from among the candidates displayed by the candidate processor 220.

The communicator 240 may communicate with an external device such as the server 10. For example, the communicator 240 may transmit and receive data related to a mentioned content.

When information received by the communicator 240 represents the user of the host terminal 20, the mention processor 250 may display content associated with the information in a mode different from the mode for the other contents on the screen of the talk room.

(2) Functional Configuration of Server

Referring to FIG. 1, functional configuration of the server 10 will be described. The server 10 may include functional units (or may be implemented by hardware components) such as a communication processor 110 and an SNS processor 120. The functions of individual functional units may be implemented by reading and executing one or more programs stored in the storage device 105 by the control device 104 (e.g., CPU 104 A).

The communication processor 110 may have a function of executing communication with each of the terminals 20 via the network 2. The communication processor 110 may transmit various items of data to the terminal 20 according to a command from the SNS processor 120. Further, the communication processor 110 may receive various items of data transmitted from the terminal 20 and transmit a notification to the SNS processor 120.

The SNS processor 120 may receive content (e.g., a message) directed to a user of a terminal 20, and transmit the content to the terminal 20 of the destination user.

The storage device 105 may store programs and various items of information on the users of the SNS. For example, the storage device 105 may store information on destination users of contents, and account information on the terminals 20 of the users.

<Process>

Figure 2:
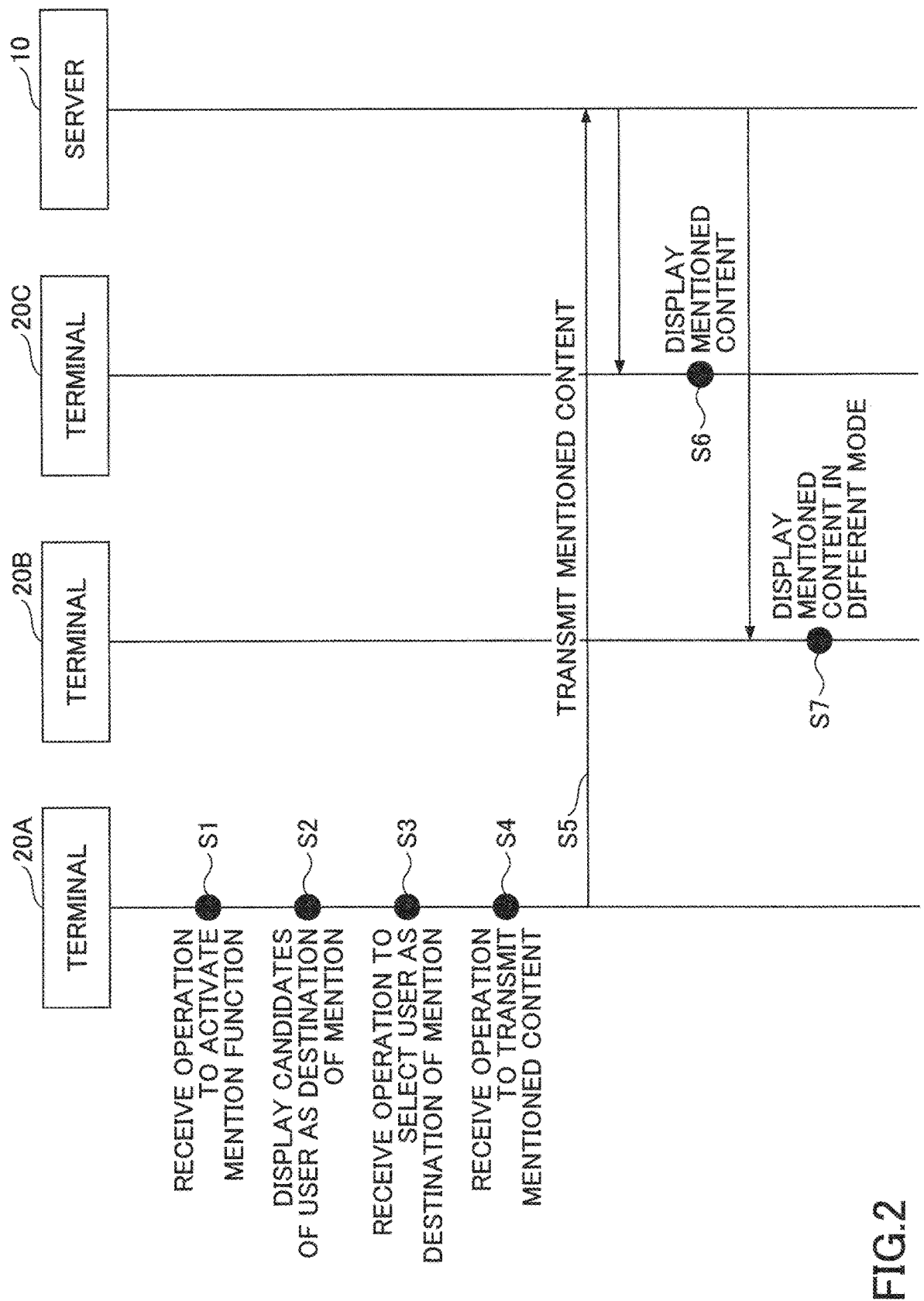
FIG. 2 is a diagram illustrating an example of a sequence of processes of a communication system, according to a first example embodiment.

Next, with reference to FIG. 2, processes in the communication system 1 will be described according to the first example embodiment. FIG. 2 is a diagram illustrating an example of sequence of a processes in the communication system 1 according to the first example embodiment.

FIG. 2 illustrates an operation sequence in the case where a mention is used to transmit and receive contents by using a messaging service of an SNS, in a talk room including multiple users A, B, and C.

The following description assumes that the user A, the user B, and the user C use the terminal 20A, the terminal 20B, and the terminal 20C, respectively.

At Operation S1, the receiver 230 of the terminal 20A may receive an operation to activate the mention function from the user A.

At Operation S2, the candidate processor 220 of the terminal 20A may display candidates for the destination user of the mention from among the users included in the talk room.

At Operation S3, the receiver 230 of the terminal 20A may receive an operation to select the user B as the destination user of the mention from the user A.

At Operation S4, the receiver 230 of the terminal 20A may receive an operation to transmit the mentioned content from the user A.

At Operation S5, the communicator 240 of the terminal 20A may transmit the mention to the talk room via the server 10.

At Operation S6, the mention processor 250 of the terminal 20C may display the received mentioned content on the screen of the talk room.

At Operation S7, because the user B is designated as the destination user of the mention, the mention processor 250 of the terminal 20B may display the received mentioned content on the screen of the talk room in a mode different from the mode for the other contents.

<<Processes Executed by Transmission Terminal 20 as a Transmitting Side for Transmitting Mentioned Content>>

Figure 3:
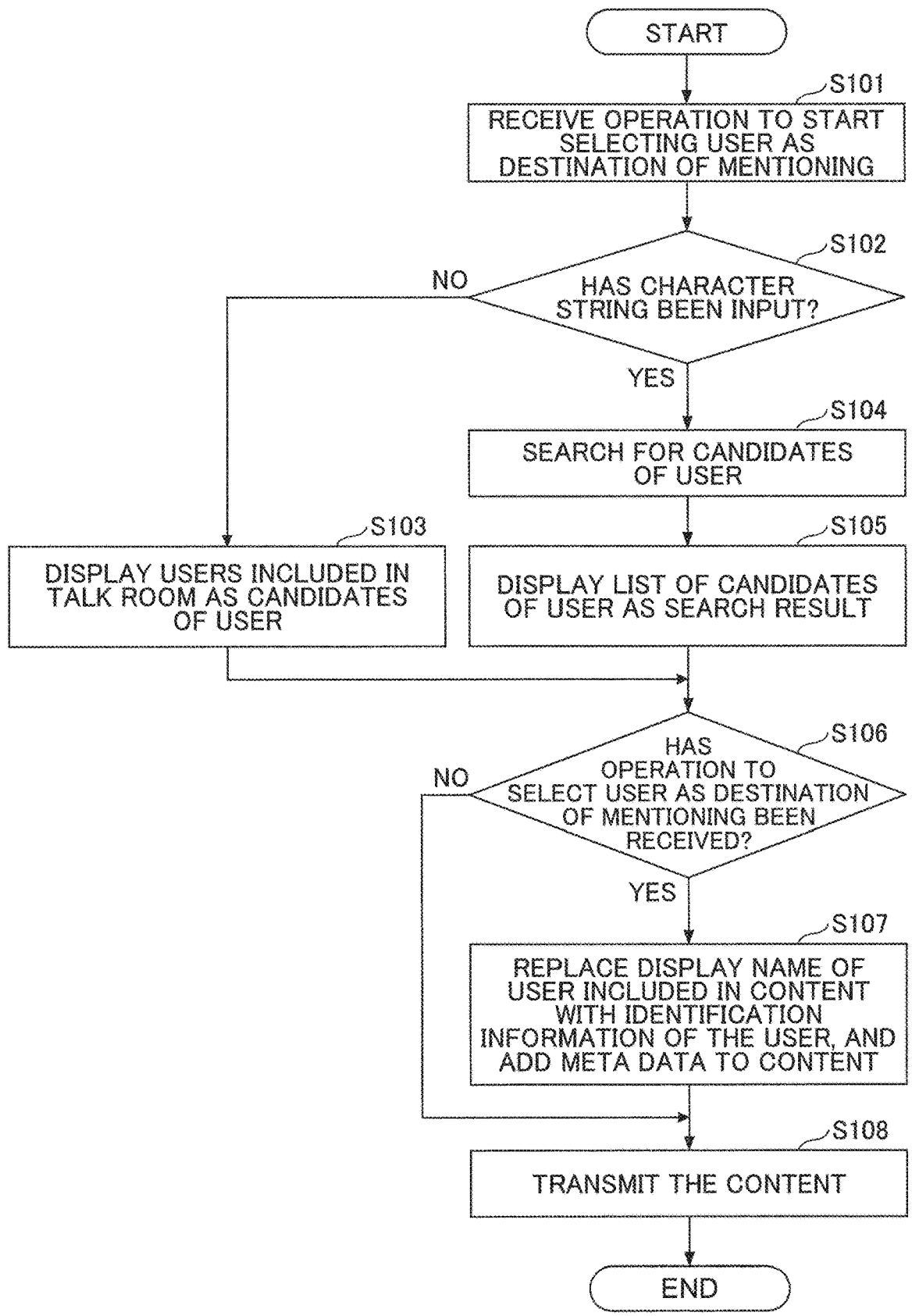
FIG. 3 is a flowchart illustrating an example of processes executed by a terminal for transmitting a mentioned content, according to the first example embodiment.
Figure 4A:
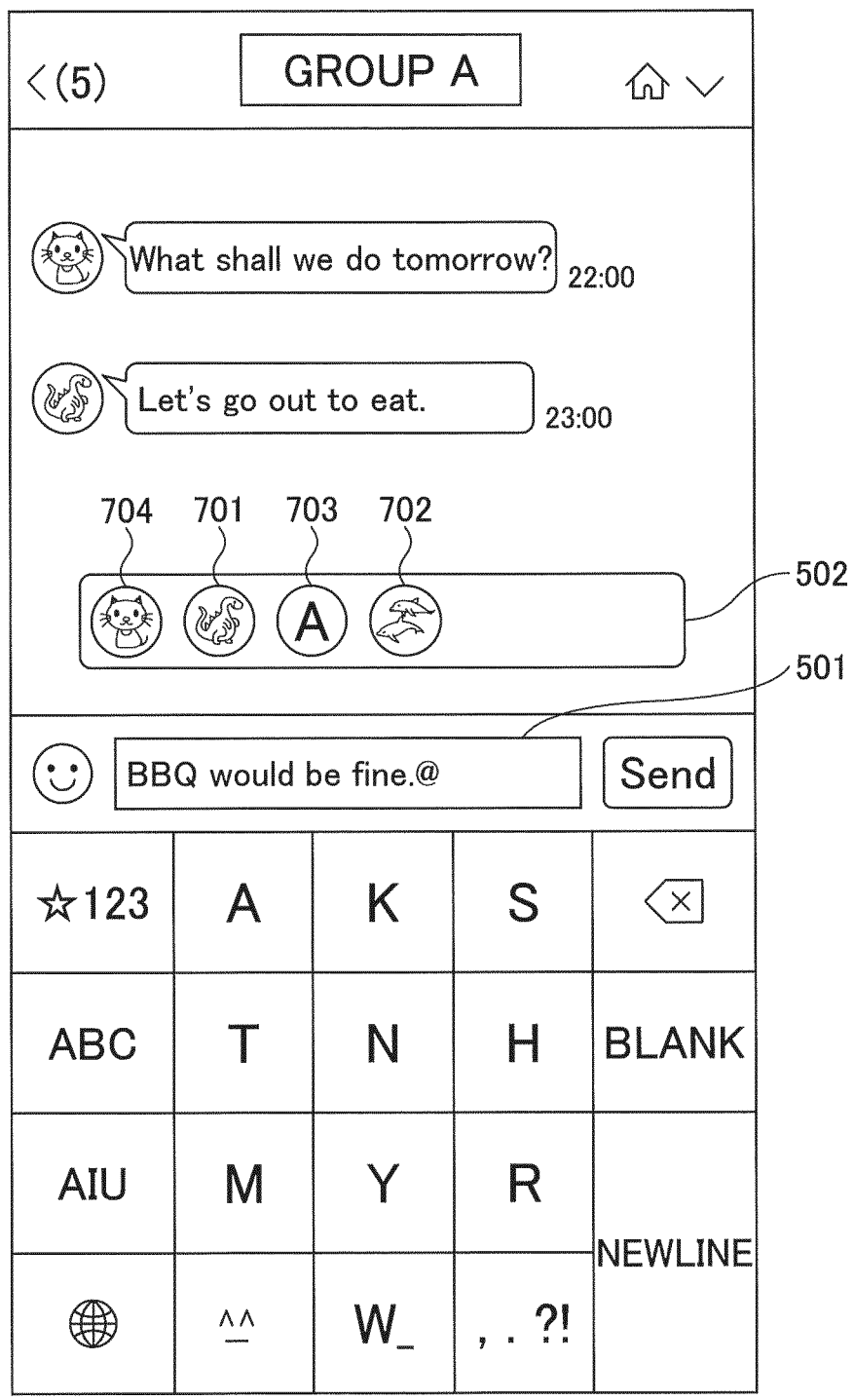
FIG. 4A is a diagram illustrating an example of a screen display on a terminal when transmitting a mentioned content.
Figure 4B:
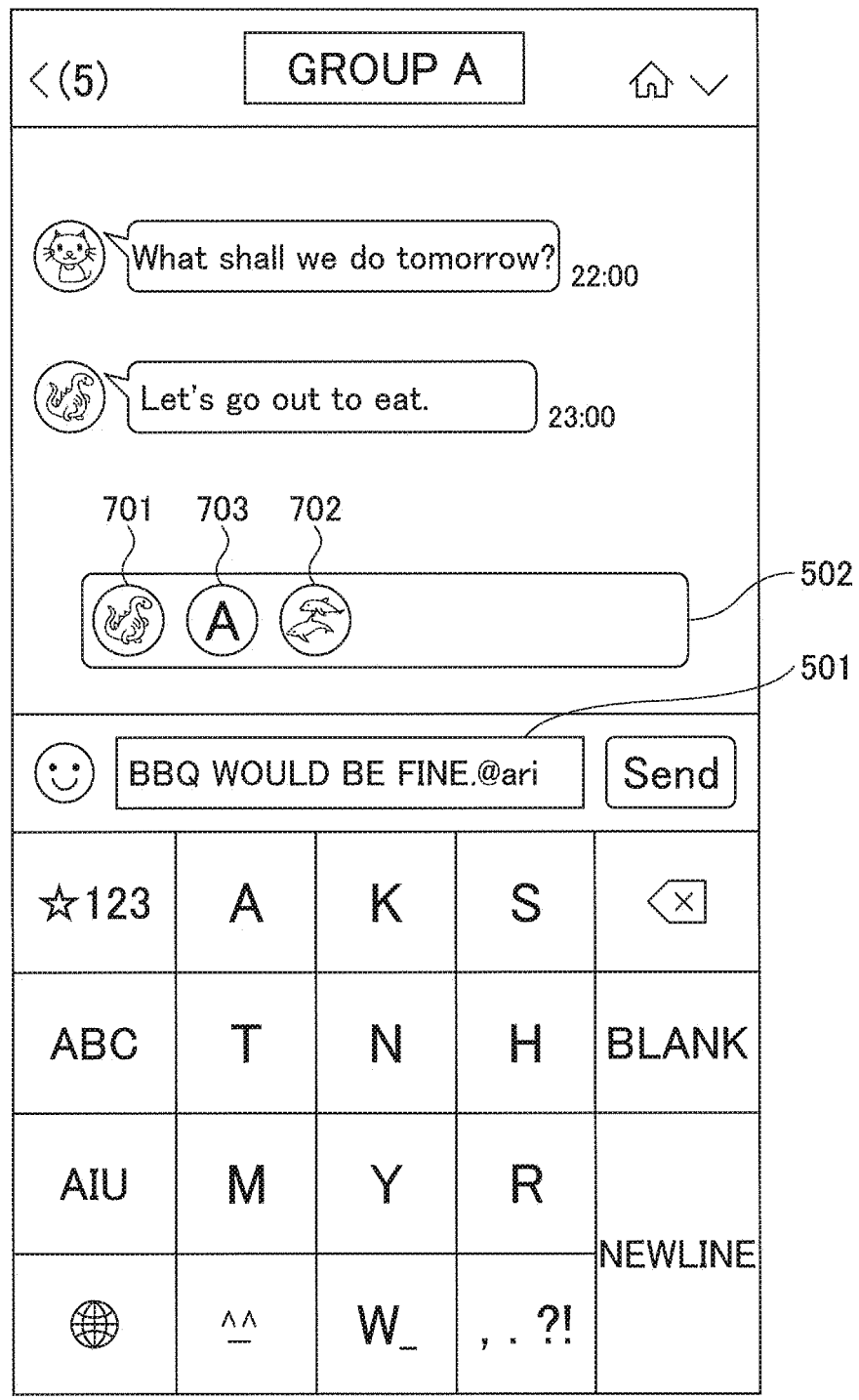
FIG. 4B is a diagram illustrating an example of a screen display on a terminal when transmitting a mentioned content.

Next, with reference to FIG. 3 to FIG. 5, processes executed by the terminal 20 for transmitting a mentioned content at Operations S1 to S4 in FIG. 2 will be described. FIG. 3 is a flowchart illustrating an example of processes executed by the terminal 20 for transmitting a mentioned content according to the first example embodiment. FIGS. 4A and 4B are diagrams illustrating examples of screen displays on the terminal 20 when transmitting a mentioned content.

At Operation S101, the receiver 230 may receive an operation to start selecting a user as the destination of a mention. For example, when a predetermined (or alternatively desired) sign such as "@" (at sign) or a predetermined (or alternatively desired) character string is input into a field for inputting content to be transmitted to the talk room, it is determined or regarded as the start or initiation of selecting a user as the destination of the mention.

At Operation S102, the candidate processor 220 may determine whether or not a character string has been input. Depending on presence or absence of a predetermined (or alternatively desired) sign such as "@" in the field for inputting content to be transmitted to the talk room, the candidate processor 220 may determine whether or not a character string has been input.

If no character string has been input (NO at Operation S102), the process proceeds to Operation S103. On the other hand, if a character string has been input (YES at Operation S102), the process proceeds to Operation S104.

At Operation S103, the candidate processor 220 may refer to the talk room information 260 included in the storage device 208 of the terminal 20, and display the users included in the talk room as candidates for the destination user of the mention, and proceed to a process of Operation S106, which will be described later. The user of the host terminal 20 may not be displayed as a candidate of the destination user of the mention.

FIG. 4A is a diagram illustrating an example of a screen display when users included in a talk room (more particularly, in the talk room information 260) is displayed as candidates for the destination user of the mention at Operation S103.

FIG. 5 is a diagram illustrating an example of the talk room information 260. The talk room information 260 may store information on other users included in the talk room. The talk room information 260 may include, for example, items of user ID, user icon, registered name of a user, and display name of a user as user information representing each user.

The user ID may be an ID of the user included in the talk room. The user icon may be an icon representing a user. The registered name of a user may be a user name (account name) registered by a user in the SNS service of the server 10.

The display name of a user may be a user name set by the user of the host terminal 20 in association with the users 20. When a display name is to be registered for a communication partner, for example, with reference to a telephone number registered in a telephone directory of the host terminal 20, a name of the communication partner registered in the telephone directory of the host terminal 20 in association with the telephone number may be used as the display name of the user.

In the example in FIG. 5, the user represented by the user icon 701 has "arisada" as the registered name of the user and has "ARISADA" as the display name of the user. The user represented by the user icon 702 has "ARISA" as the registered name of the user and has "arisa" as the display name of the user. The user represented by the user icon 703 has "arimi" as the registered name of the user and has "ARIMI" as the display name of the user. The user represented by the user icon 704 has "tana" as the registered name of the user and has "TANAKA" as the display name of the user.

When data as illustrated in FIG. 5 is stored in the talk room information 260, as illustrated in FIG. 4A, and when "@" (at sign) is input into a field 501 for inputting content to be transmitted to the talk room in a display area 502, the user icons 701, 702, 703, and 704 of the other users included in the talk room may be displayed as candidates for the destination user of a mention. The user icons 701, 702, 703, and 704 may be displayed in any order (e.g., a descending order in terms of the number of transmissions of contents within a predetermined (or alternatively desired) time in the talk room, or a descending order in terms of the number of transmitted contents mentioned in the talk room).

In the case where a character string is input on the display screen in FIG. 4A, the process may proceed to Operation S104.

At Operation S104, based on the input character string, the candidate processor 220 may search in the talk room information 260 for candidates for the destination user of a mention.

At Operation S105, the candidate processor 220 may display a list of the candidates for a destination user as the search result.

FIG. 4B is a diagram illustrating an example of a screen display when displaying a list of candidates for the destination user of a mention, who have been found based on the input character strings at Operation S104 and Operation S105.

FIG. 4B illustrates an example in which "@" has been input into the field 501 for inputting content to be transmitted to the talk room, and a character string "ari" is input immediately after "@". In this case, users whose "registered name of the user" includes the character string "ari" are searched in the talk room information 260. In some example embodiments, if two leading character strings of a registered name of a user 20 have the same as the input character string (e.g., substring), the registered name of the user may be determined to include the substring. Then, in the display area 502, user icons of the found users are displayed as candidates for the destination user of the mention. For example, in the case where data as illustrated in FIG. 5 is stored in the talk room information 260, the user icons 701, 702, and 703 are displayed in the display area 502. In some example embodiments, the registered name(s) of the found candidate user(s) or the display name(s) of the found candidate user(s) may be displayed in the display area 502 in association with the user icon(s). This enables to distinguish the found candidate user(s), for example, even when default icons are used as the user icons and there are multiple users using the same user icon.

At Operation S106, the mention processor 250 determines whether or not an operation to select a user as the destination of the mention has been received.

If an operation to select a user as the destination of the mention has been received (YES at Operation S106), the process proceeds to Operation S107. On the other hand, if an operation to select a user as the destination of the mention has not been received (NO at Operation S106), the process proceeds to Operation S108.

At Operation S107, the mention processor 250 may replace the user icon of the selected user as the destination of the mention with the identification information of the selected user as the destination of the mention, which is to be included in the content to be transmitted, and add metadata indicating that the content is a mentioned content to the content to be transmitted. For example, the user icon may be replaced with a character string having a form of "@ (identification information on the destination user)." In some example embodiments, a predetermined (or alternatively desired) tag may be added so as to be recognized as the identification information of the destination user.

Multiple users may be selected as the destination users of a mention.

Figure 4C:
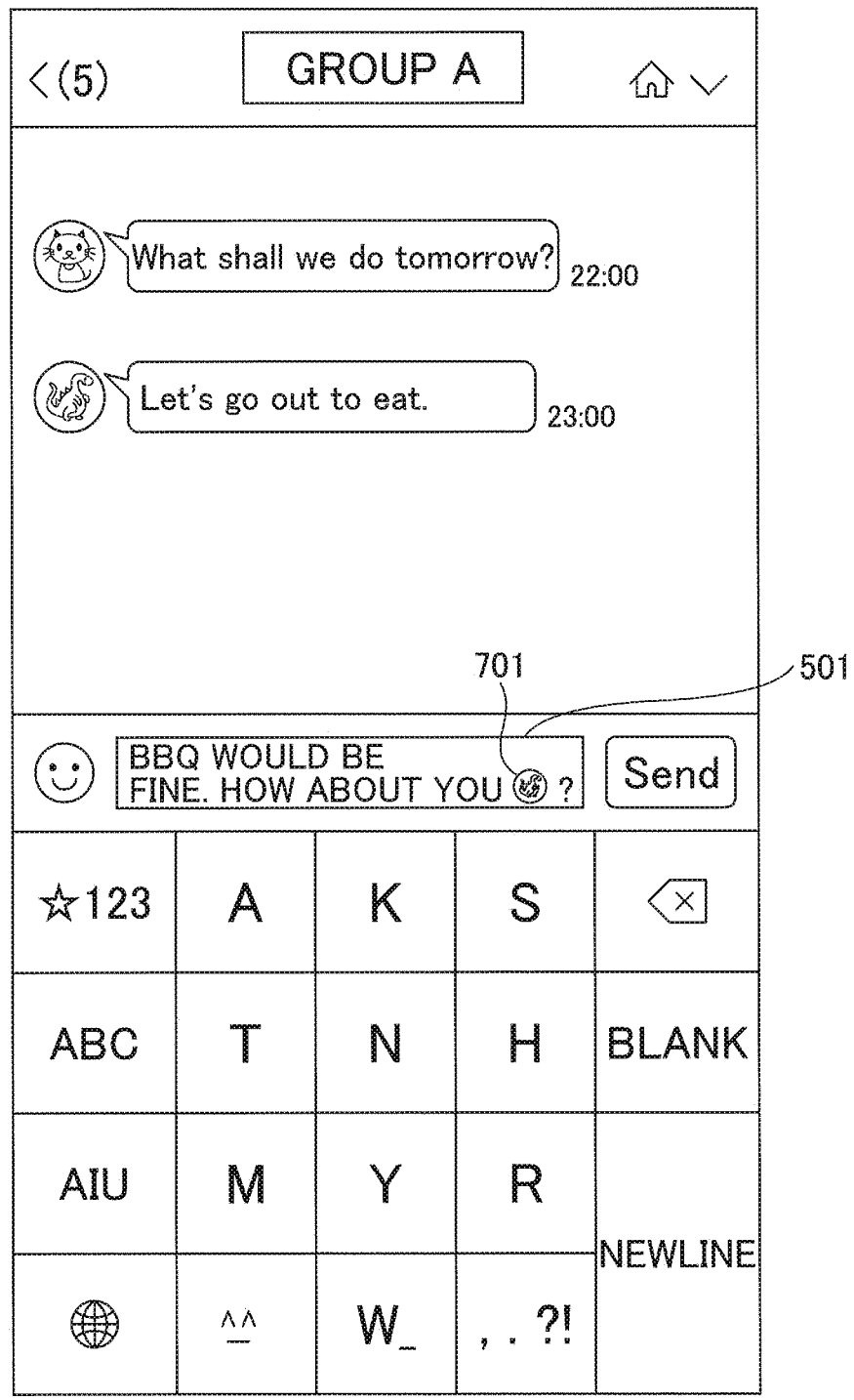
FIG. 4C is a diagram illustrating an example of a screen display on a terminal when transmitting a mentioned content.

FIG. 4C is a diagram illustrating an example of a screen display when transmitting the content mentioned at Operation S107.

In FIG. 4C, in the field 501 for inputting the content to be transmitted to the talk room, the user icon 701 of the destination user of the mention may be displayed within the message input from the user of the terminal 20. This is because the user icon 701 has been selected as the destination user of the mention by, for example, a tap operation from among the candidates for the destination user(s) of the mention that has been displayed in the display area 502 in FIG. 4B at Operation S106.

At Operation S108, in response to receiving an operation to transmit the mentioned content, the communicator 240 transmits the content to the terminals 20 of the other users included in the talk room via the server 10.

According to the example embodiment, a user who transmits a mentioned content can transmit the content in which the destination user in the talk room is highlighted, and thus the destination user can visually recognize the content easily.

First Modified Example

In a first modified example, the destination user of a mention is designated by using the name of a communication partner registered in a telephone directory of the terminal 20A or a contact list of the SNS.

Figure 6:
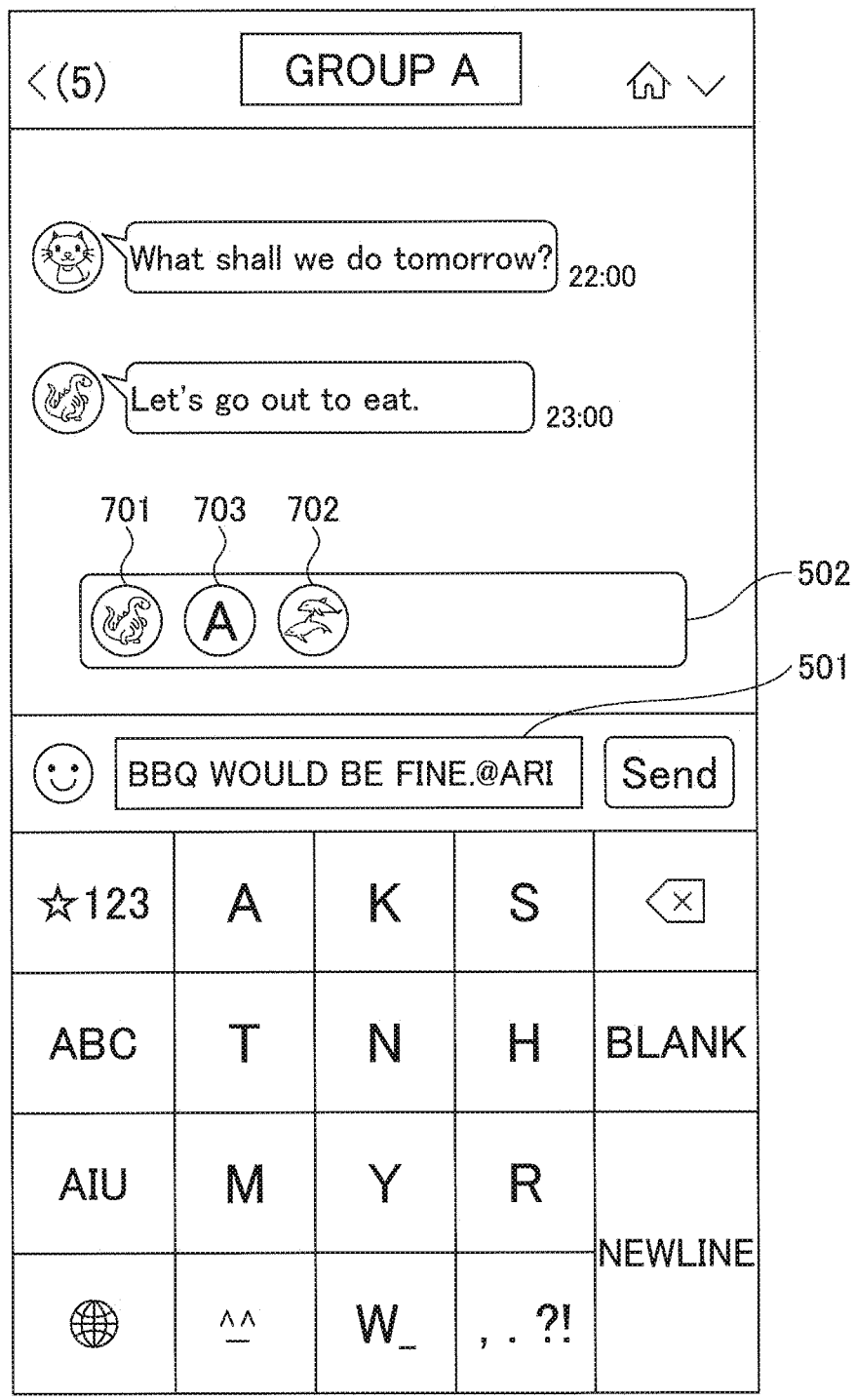
FIG. 6 is a diagram illustrating another example of a screen display when displaying a list of candidates for the destination user of a mention, found based on an input character string.

With reference to FIG. 6, a process of searching in the talk room information 260 for a user that satisfies the matching condition by the "display name of the user" (instead of "the registered name of the user" in the example embodiment of FIG. 4B) will be described. This process may be executed at Operation S104 in FIG. 3 based on an input character string.

FIG. 6 is a diagram illustrating another example (part 1) of a screen display when displaying a list of candidates for the destination user of a mention, who have been found based on the input character string.

FIG. 6 illustrates an example in the case where "@" has been input into the field 501 for inputting content to be transmitted to the talk room, and a character string "ARI" is input immediately after "@". In this case, when data as illustrated in FIG. 5 is stored in the talk room information 260, users including the character string "ARI" in the "display name of the user" are searched in the talk room information 260, and the user icons 701, 702, and 703 of the found users are displayed in the display area 502 as candidates for the destination user of the mention.

The user A of the host terminal 20A may designate the destination user of the mention by using the name of a communication partner registered in the telephone directory of the host terminal 20A or the contact list of the SNS.

Second Modified Example

In a second modified example, the destination user of a mention may be designated by using the user name registered by the communication partner in the SNS service of the server 10, and the name of the communication partner registered in a telephone directory of the terminal 20A or a contact list of the SNS.

Figure 7:
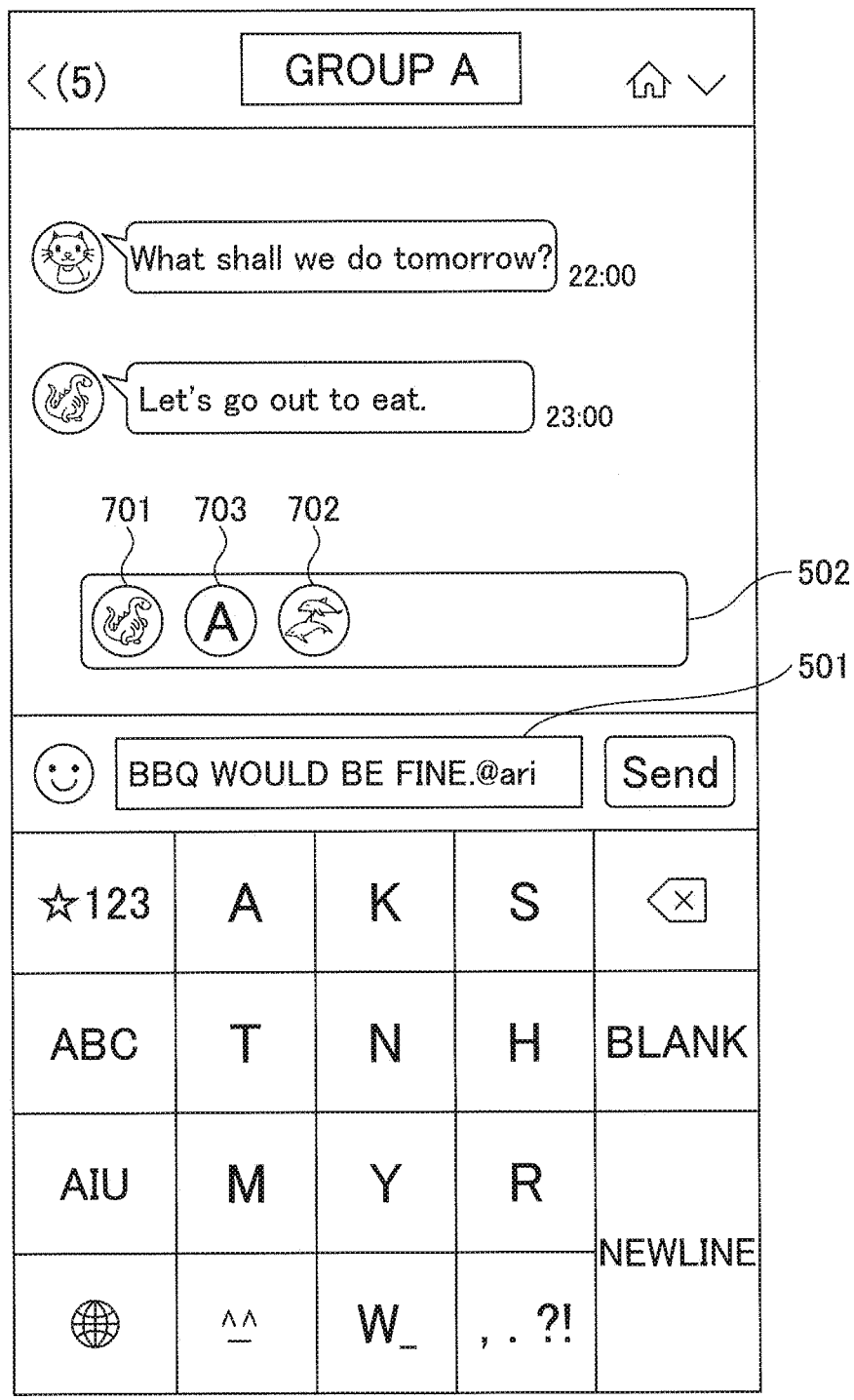
FIG. 7 is a diagram illustrating another example of a screen display when displaying a list of candidates for the destination user of a mention, searched based on an input character string.

With reference to FIG. 7, a process of searching in the talk room information 260 for a user that satisfies the matching condition based on the "registered name of the user" and the "display name of the user" will be described, which may be executed at Operation S104 in FIG. 3 based on an input character string.

FIG. 7 is a diagram illustrating another example (part 2) of a screen display displaying a list of candidates for the destination user of a mention, who have been found based on the input character string.

FIG. 7 illustrates an example in which "@" has been input into the field 501 for inputting content to be transmitted to the talk room, which is the same as or substantially similar to the example illustrated in FIG. 4B, and a character string "ari" is input immediately after "@". In this case, when data as illustrated in FIG. 5 is stored in the talk room information 260, users including the character string "ari" in the "registered name of the user" or in the "display name of the user" are searched in the talk room information 260, and the user icons 701, 702, and 703 of the found users are displayed in the display area 502 as candidates for the destination user of the mention.

<Process Executed by Terminal 20 when Receiving Mentioned Content>

Figure 9A:
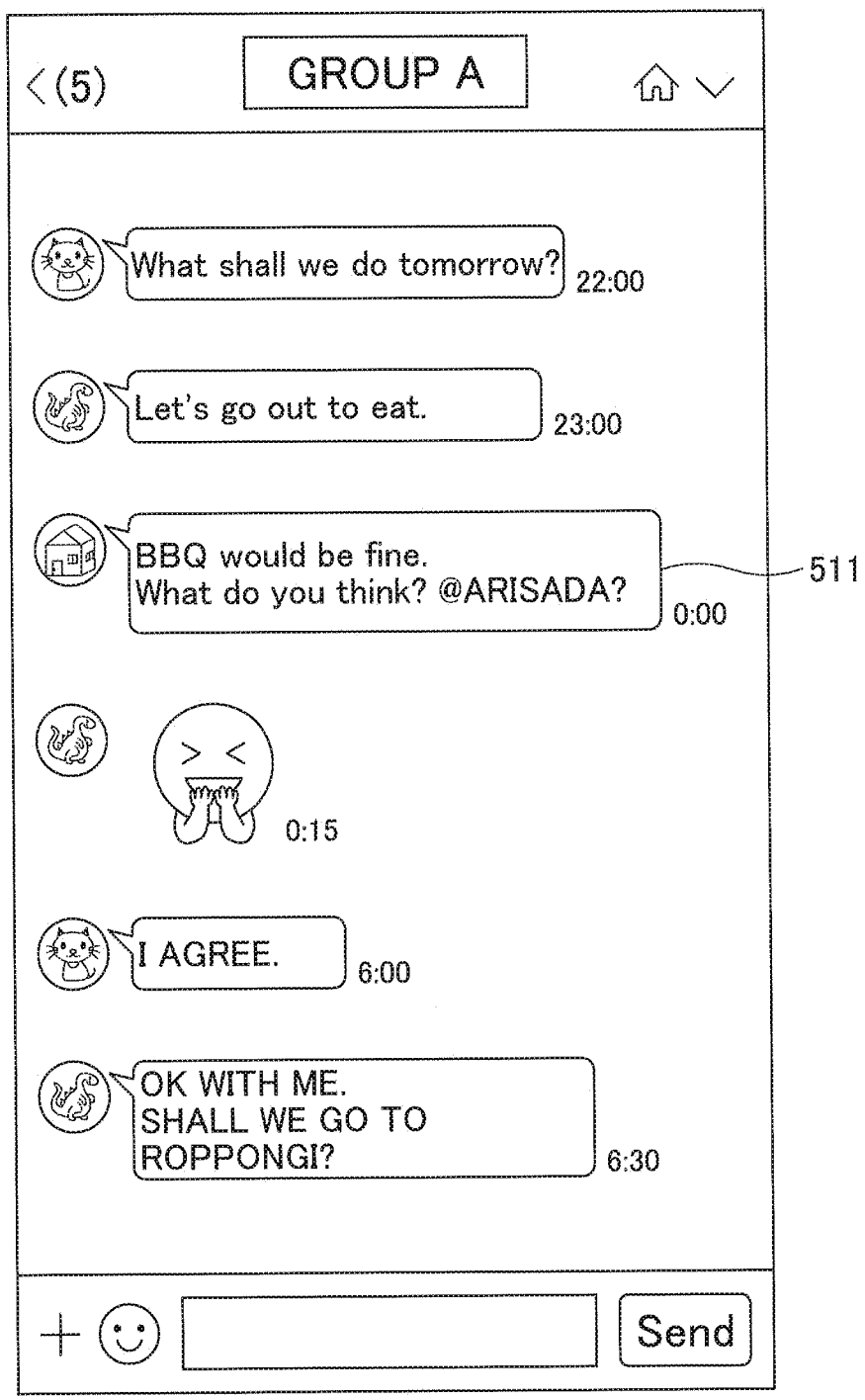
FIG. 9A is a diagram illustrating an example of a screen display on a terminal when displaying a received mentioned content.
Figure 9B:
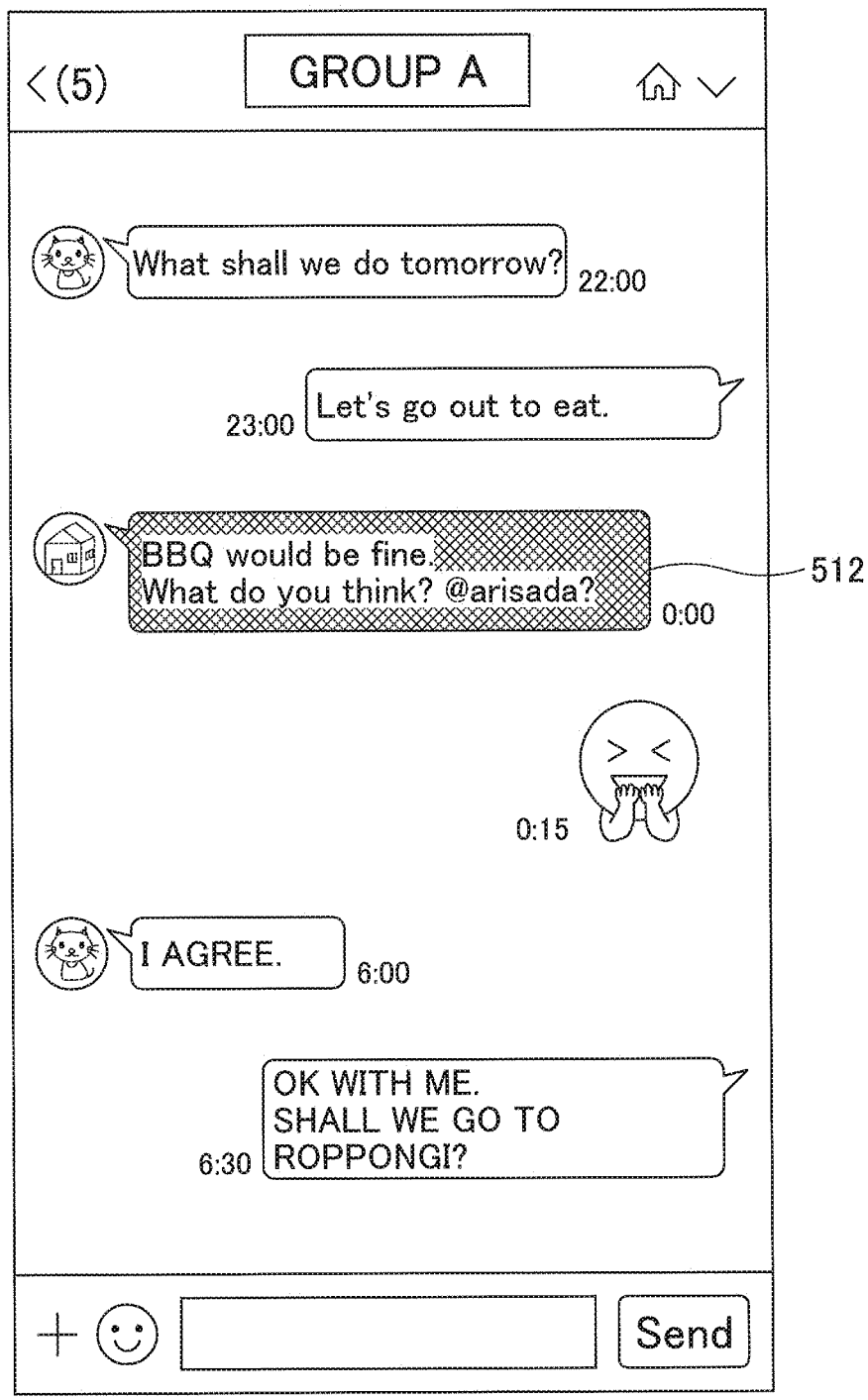
FIG. 9B is a diagram illustrating an example of a screen display on a terminal when displaying a received mentioned content.

Next, with reference to FIG. 8, FIG. 9A, and FIG. 9B, processes executed by the terminal 20 when displaying a received mentioned content at Operations S6 and S7 in FIG. 2 will be described. FIG. 8 is a flowchart illustrating an example of a process executed by the terminal 20 when a mentioned content according to the first example embodiment is received. FIG. 9A and FIG. 9B are diagrams illustrating examples of screen displays of the terminal 20 when displaying a received mentioned content.

At Operation S201, the mention processor 250 receives content in the talk room.

At Operation S202, the mention processor 250 determines whether or not metadata representing that the content has been mentioned is added to the received content.

If added (YES at Operation S202), the process proceeds to Operation S203. On the other hand, if not added (NO at Operation S202), the process proceeds to Operation S206.

At Operation S203, the mention processor 250 determines whether the identification information of the destination user of the mention included in the received content matches the identification information of the user of the host terminal 20.

If they do not match (NO at Operation S203), the process proceeds to Operation S204. On the other hand, if they match (YES at Operation S203), the process proceeds to Operation S205.

At Operation S204, the mention processor 250 refers to the talk room information 260, replaces the identification information of the destination user of the mention included in the content with the display name of the user, and proceeds to Operation S207.

FIG. 9A is a diagram illustrating an example of a screen display on the terminal when displaying at Operation S204 the display name of the user as replacement identification information when the destination user of a mention is not the user of the host terminal 20. For example, on the terminal 20C, when the display name of the user associated with the user ID "aaa" is "ARISADA", the identification information of the user included in the content may be replaced with "ARISADA" to be displayed in a display area 511.

The process at Operation S204 may be executed when displaying the mentioned content in the talk room screen, not when receiving the content. In some example embodiments, when the contents displayed on the talk room screen are moved, for example, by a scroll operation, the process at Operation S204 may be executed for mentioned contents whose locations in chronological order are within a predetermined (or alternatively desired) range from the currently displayed content. This enables to alleviate the load on the terminal 20, for example, even when a large number of mentioned contents are received in a short period of time, and enables smooth displaying on the terminal 20.

At Operation S205, the mention processor 250 may refer to the talk room information 260, and replace the identification information of the destination user of the mention included in the content with the registered name of the user.

FIG. 9B is a diagram illustrating an example of a screen display on the terminal when displaying at Operation S205 the display name of the user as replacement identification information when the destination user of a mention is the user of the host terminal 20. For example, on the terminal 20B, when the registered name of the user associated with the user ID "aaa" is "arisada", the identification information of the user included in the content may be replaced with "arisada" to be displayed in a display area 512.

At Operation S206, the mention processor 250 may determine the display mode of the content.

When the destination user of the mention is the user of the terminal 20, the mentioned content may be displayed in a display mode different from the display mode of the other contents by, for example, changing the color and/or size of a balloon (display area of a message), enlarging the character size, displaying the characters in bold letters and/or italics, adding marks and/or stamps, or adding a predetermined (or alternatively desired) animation (motion).

In this case, as a predetermined (or alternatively desired) animation (motion), for example, the following motions may be adopted when displaying the content.

motion of enlarging the size of the content, and then, reducing it to the original size.

motion of displaying the content on the full screen, and then, reducing it to the same or substantially similar size to the other contents.

motion of displaying the content in a color different from the other contents, and then displaying the content in the same color as the other contents.

motion of gradually changing the transmittance of the content.

motion of vibrating the content.

This enables to highlight the mentioned content when displaying compared with the other contents, so as to be easily recognizable by the user.

In the example in FIG. 9B, the color of the content display area 512, which is a balloon, is changed from white to another color.

At Operation S207, the mention processor 250 may display the mentioned content.

Thus, it becomes possible for a predetermined (or alternatively desired) user included in the group to view (or visually recognize) a predetermined (or alternatively desired) content with relative ease when contents are transmitted and received in a group including multiple users.

Second Example Embodiment

The second example embodiment has a form in which in a talk room including multiple users, a user designated as the destination user of a mention is allowed to view contents that have been transmitted and received.

The matter described in the second example embodiment can be applied to any of the other example embodiments.

Because the second embodiment is the same as or substantially similar to the first example embodiment except for some features, repetitive descriptions of the overlapping features will be omitted. In the following, a process in a communication system 1 according to the second example embodiment will be described in detail focusing on differences from the first example embodiment.

<Processes>

Figure 10:
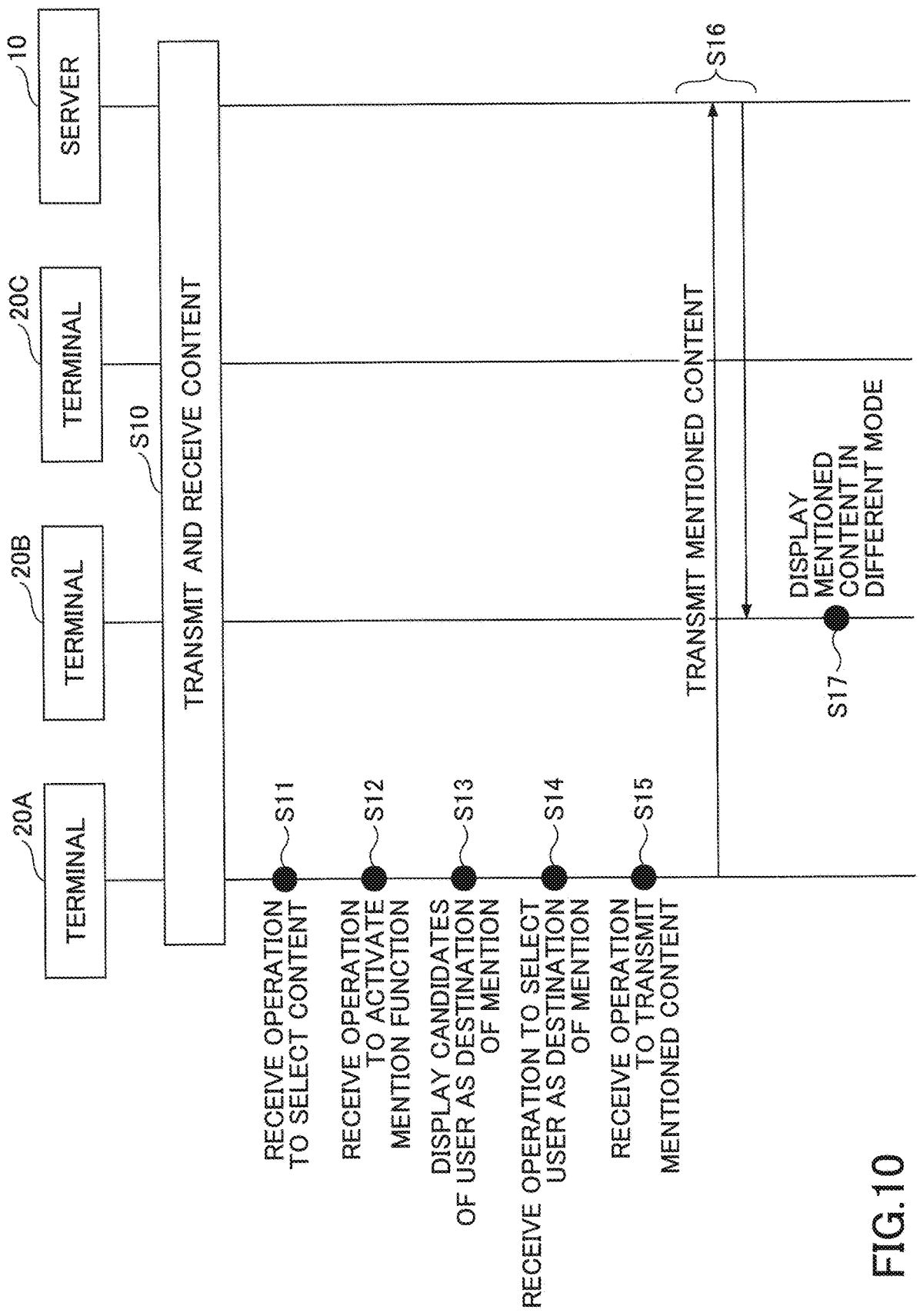
FIG. 10 is a diagram illustrating an example of a sequence of processes in a communication system according to a second example embodiment.

Next, with reference to FIG. 10, processes in the communication system 1 according to the second example embodiment will be described. FIG. 10 is a diagram illustrating an example of a sequence of processes executed in the communication system 1 according to the second example embodiment.

FIG. 10 illustrates an operation sequence in the case where contents are transmitted and received by using a messaging service of an SNS in a talk room including multiple users A, B, and C, and the mentioned contents are used.

In the following description, assume that the user A, the user B, and the user C use the terminal 20A, the terminal 20B, and the terminal 20, respectively.

At Operation S10, in the talk room including multiple users A, B and C, contents are transmitted and received by using the messaging service of the SNS.

At Operation S11, the receiver 230 of the terminal 20A may receive an operation to select content that has been transmitted and received in the talk room from the user A.

At Operation S12, the receiver 230 of the terminal 20A may receive an operation to activate the mention function from the user A.

At Operation S13, the candidate processor 220 of the terminal 20A may display candidates for the destination user of the mention from among the users included in the talk room.

At Operation S14, the receiver 230 of the terminal 20A may receive an operation to select the user B from among the candidates as the designation user of the mention from the user A.

At Operation S15, the receiver 230 of the terminal 20A may receive an operation to transmit the mentioned content from the user A.

At Operation S16, the communicator 240 of the terminal 20A may transmit the mentioned content to the terminal 20B of the destination user via the server 10.

At Operation S17, because the user B is designated as the destination user of the mention, the mention processor 250 of the terminal 20B may display the transmitted and received content associated with the received mentioned content in a mode different from the mode of the other contents on the screen of the talk room.

<<Processes Executed by Terminal 20 as a Transmitting Side for Transmitting Mentioned Content>>

Figure 11:
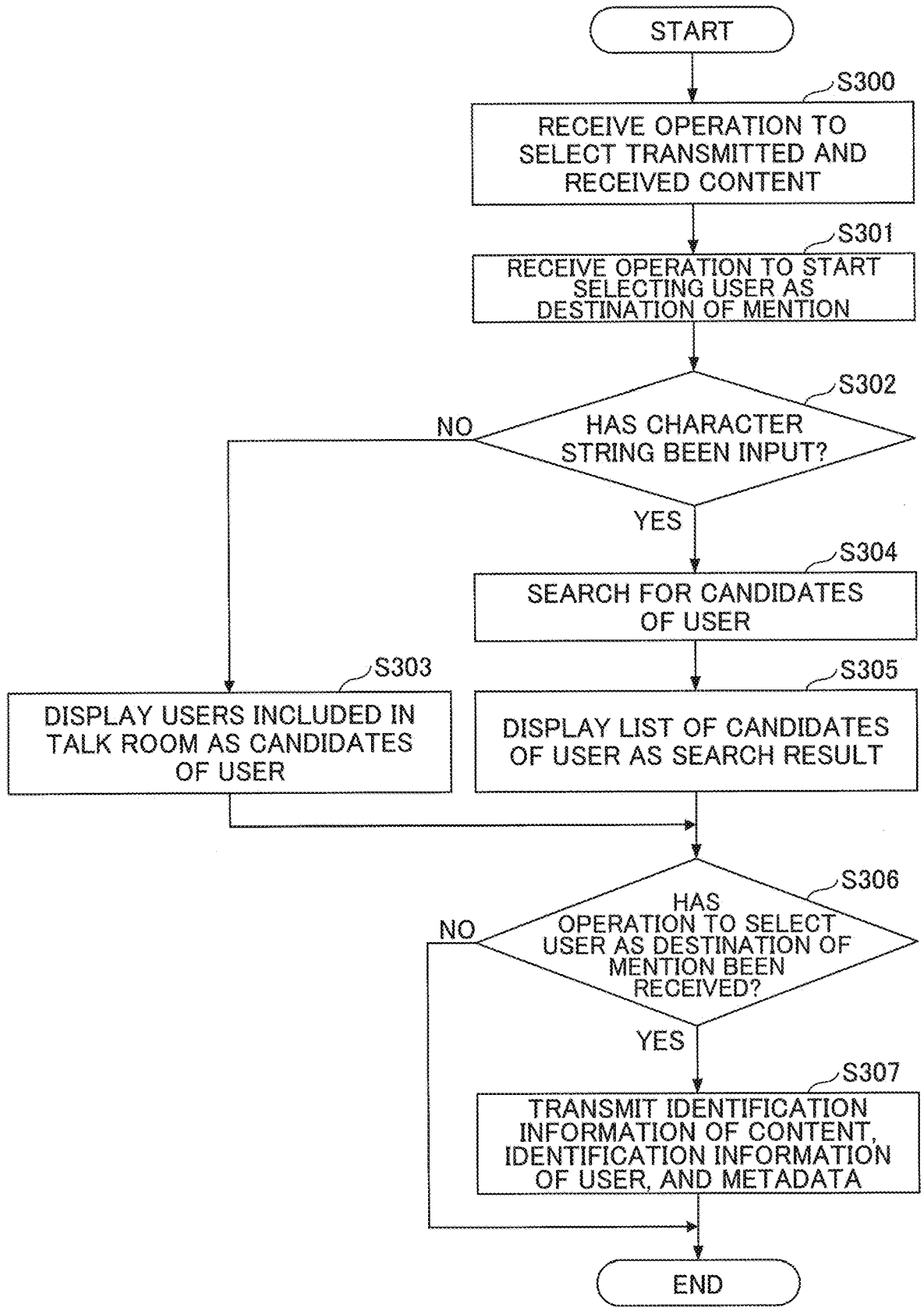
FIG. 11 is a flowchart illustrating an example of processes executed by a terminal when transmitting a mentioned content according to the second example embodiment.

Next, with reference to FIG. 11, processes (e.g., Operations S10 to S15 in FIG. 10) executed by the terminal 20 when transmitting the mentioned content will be described. FIG. 11 is a flowchart illustrating an example of processes executed by the terminal 20 when transmitting the mentioned content according to the second example embodiment. Note that Operations S301 to S306 are the same as or substantially similar to the process at Operations S101 to S106 in FIG. 3 in the first example embodiment.

At Operation S300, the receiver 230 receives an operation to select content transmitted and received in the talk room. Note that there may be a case where the terminal 20 that is to receive a mentioned content does not store the content corresponding to the mentioned content, for example, due to a model change or the like. Therefore, contents selectable at Operation S300 may be restricted to those that were transmitted and received within a predetermined (or alternatively desired) period (e.g., two weeks). In this case, if the terminal 20 (e.g., 20B) on the receiving side of the mentioned content does not store the content corresponding to the mentioned content, the terminal 20 (e.g., 20C) may use, for example, the identification information (message ID) of the received content to obtain again the content corresponding to the mentioned content from the server 10, or may obtain the content corresponding to the mentioned content from the terminal 20 (e.g., 20A) on the transmitting side.

At Operation S301, the receiver 230 may receive an operation to start selecting a user as the destination of the mention.

At Operation S302, the candidate processor 220 may determine whether or not a character string has been input.

If no character string has been input (NO at Operation S302), the process may proceed to Operation S303. On the other hand, when a character string has been input (YES at Operation S302), the process may proceed to Operation S304.

At Operation S303, the candidate processor 220 may refer to the talk room information 260 to display the users included in the talk room as candidates for the destination user of the mention, and proceed to a process of Operation S306, which will be described later.

At Operation S304, based on the input character string, the candidate processor 220 may search in the talk room information 260 for candidates for the destination user of the mention.

At Operation S305, the candidate processor 220 may display a list of candidates for the destination user as the search result.

At Operation S306, the mention processor 250 may determine whether or not an operation to select a user as the destination of the mention has been received.

If an operation to select a user as the destination of the mention has been received (YES at Operation S306), the process may proceed to Operation S307. On the other hand, if an operation to select a user as the destination of the mention has not been received (NO at Operation S306), the process may be terminated.

At Operation S307, in response to the operation receiving an operation to transmit the mentioned content, the communicator 240 may transmit the identification information of the content selected at Operation S301, the identification information of the destination user of the mention, and metadata representing that the content is mentioned to the terminal 20 (e.g., 20C) of the destination user of the mention included in the talk room via the server 10.

<<Processes Executed by the Terminal 20 for Receiving Mentioned Content>>

Figure 12:
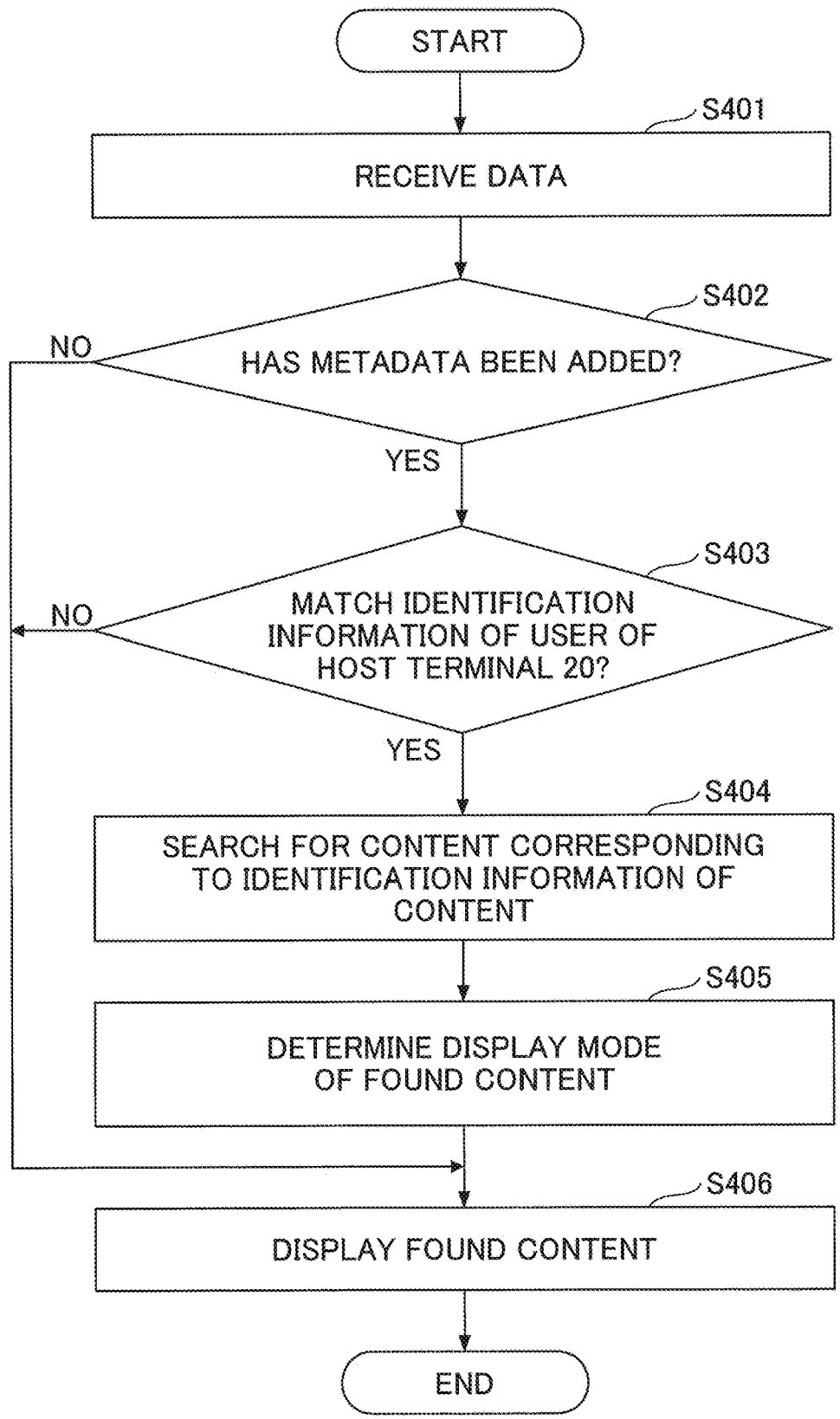
FIG. 12 is a flowchart illustrating an example of processes executed by a terminal when receiving a mentioned content according to the second example embodiment.
Figure 13A:
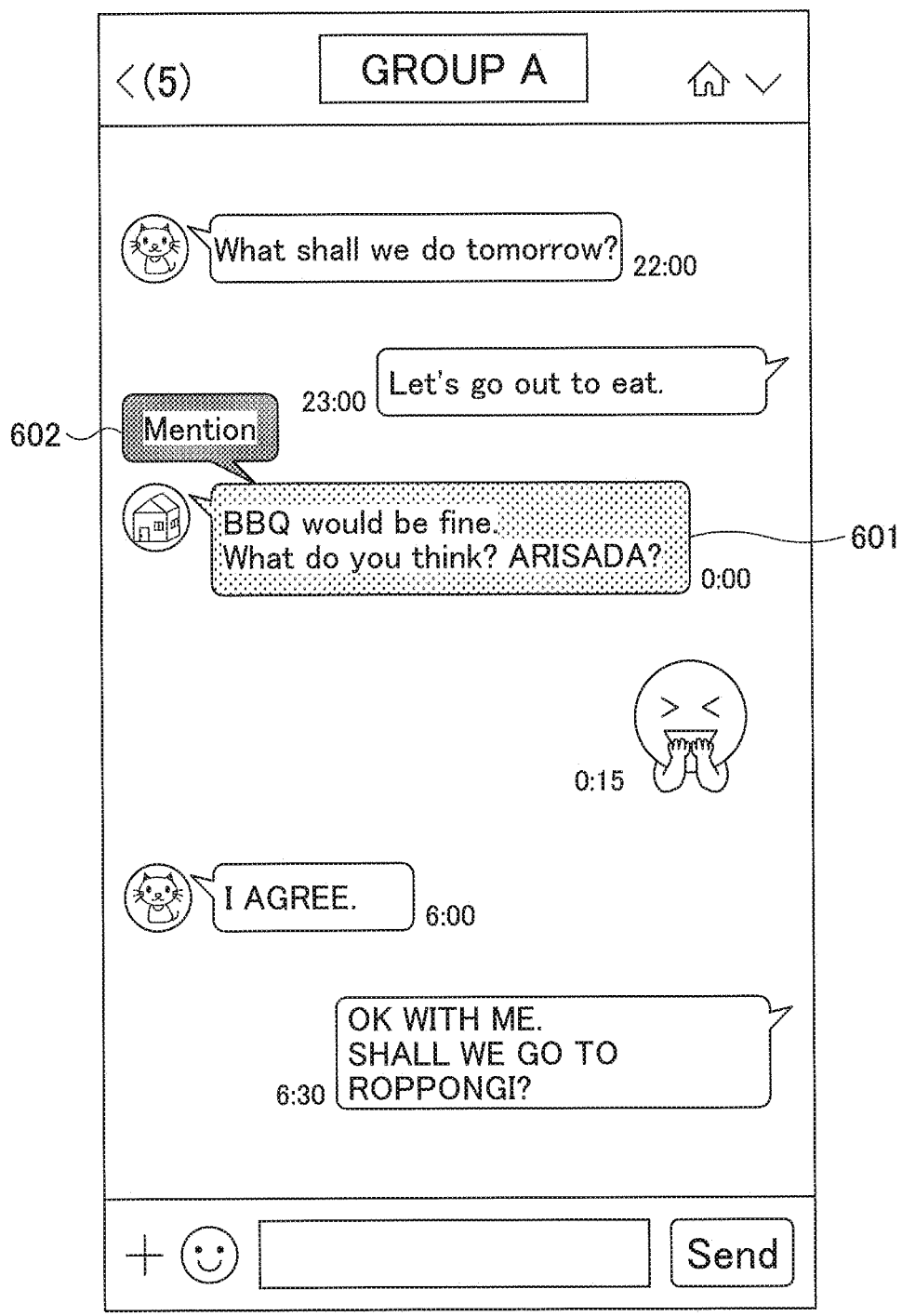
FIG. 13A is a diagram illustrating another example of a screen display on a terminal when displaying a received mentioned content.
Figure 13B:
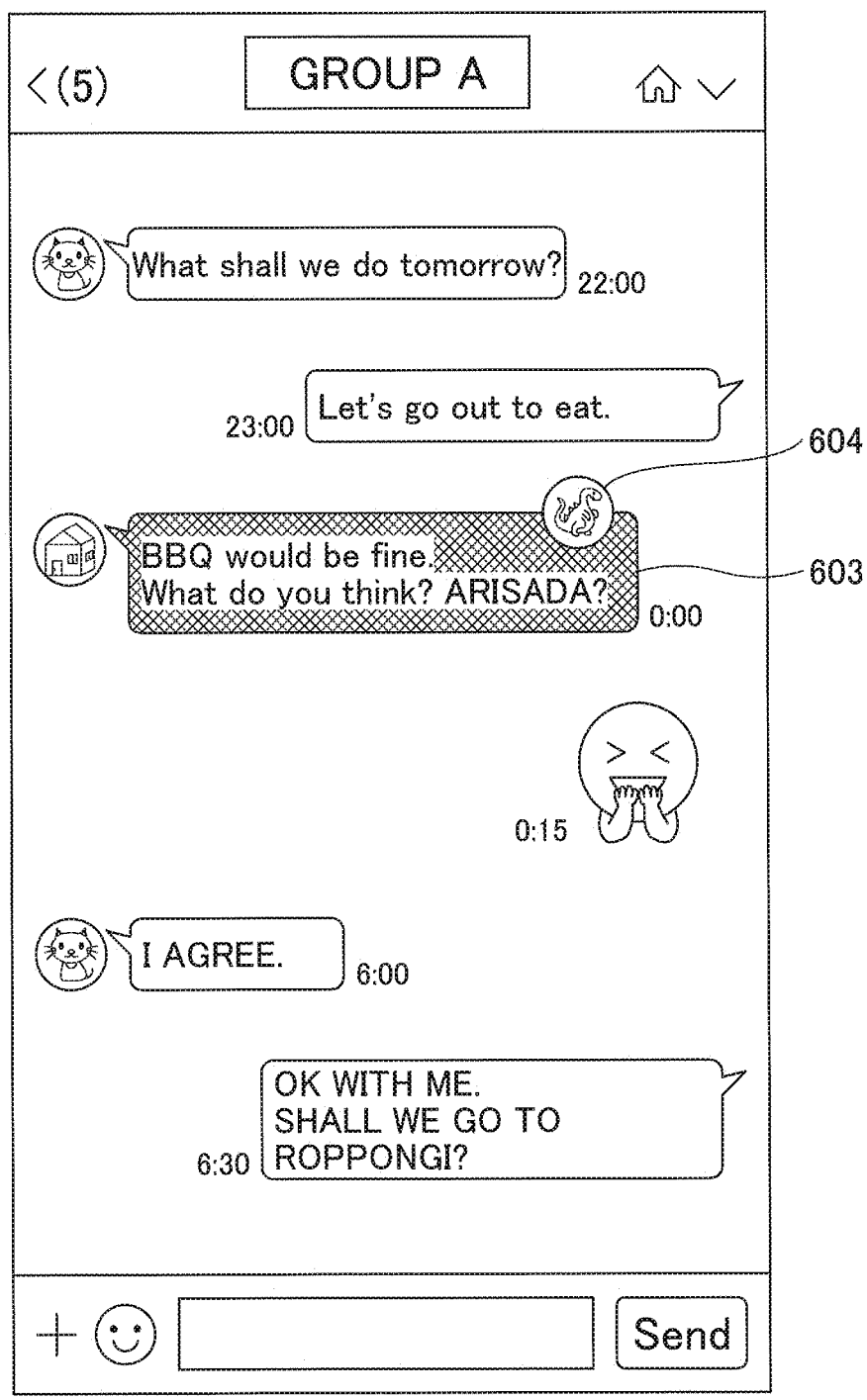
FIG. 13B is a diagram illustrating another example of a screen display on a terminal when displaying a received mentioned content.

Next, with reference to FIG. 12, FIG. 13A, and FIG. 13B, processes executed by the terminal 20 at Operation S17 in FIG. 10 when displaying the received mentioned content will be described. FIG. 12 is a flowchart illustrating an example of the processes executed by the terminal 20 when receiving the mentioned content according to the second example embodiment. FIGS. 13A and 13B are diagrams illustrating other examples of screen displays on the terminal when displaying a received mentioned content.

At Operation S401, the mention processor 250 may receive data in the talk room.

At Operation S402, the mention processor 250 may determine whether or not metadata representing that the content has been mentioned is added to the received data.

If added (YES at Operation S402), the process may proceed to Operation S403. On the other hand, if not added (NO at Operation S402), the process may be terminated.

At Operation S403, the mention processor 250 may determine whether or not the identification information of the destination user of the mention included in the received content matches the identification information of the user of the host terminal 20.

If the result of the determining operation of Operation S403 indicates matching (YES at Operation S403), the process may proceeds to Operation S404. On the other hand, if the result of the determining operation of Operation S403 indicates no matching (NO at Operation S403), the process may be terminated.

At Operation S404, the mention processor 250 may search in the talk room for content corresponding to the identification information of the content included in the received data.

At Operation S405, the mention processor 250 may determine the display mode of the found content.

At Operation S406, the mention processor 250 displays the found content in the determined display mode.

FIG. 13A illustrates an example in the case where a mark 602 indicating that the content has been mentioned is added to a display area 601 of the content found at Operation S406.

FIG. 13B illustrates an example in the case where a display area 603 of the content found at Operation S406 is displayed in a color different from the color of the other contents and a mark of a user icon 604 of the destination user is added.

In this case, the terminal 20 that has received the mentioned content may display the mentioned content, for example, as the first content when the screen of the talk room is opened after having received the mention.

Third Modified Example

In a third modified example, an additional content is transmitted and received in association with content that has been mentioned on a terminal 20 on the transmitting side of the mentioned content or a terminal 20 on the receiving side of the mentioned content.

The terminal 20 on the transmitting side of the mentioned content or the terminal 20 on the receiving side of the mentioned content transmits and receives an additional content input by the user in association with the identification information of the mentioned content, respectively.

Figure 14:
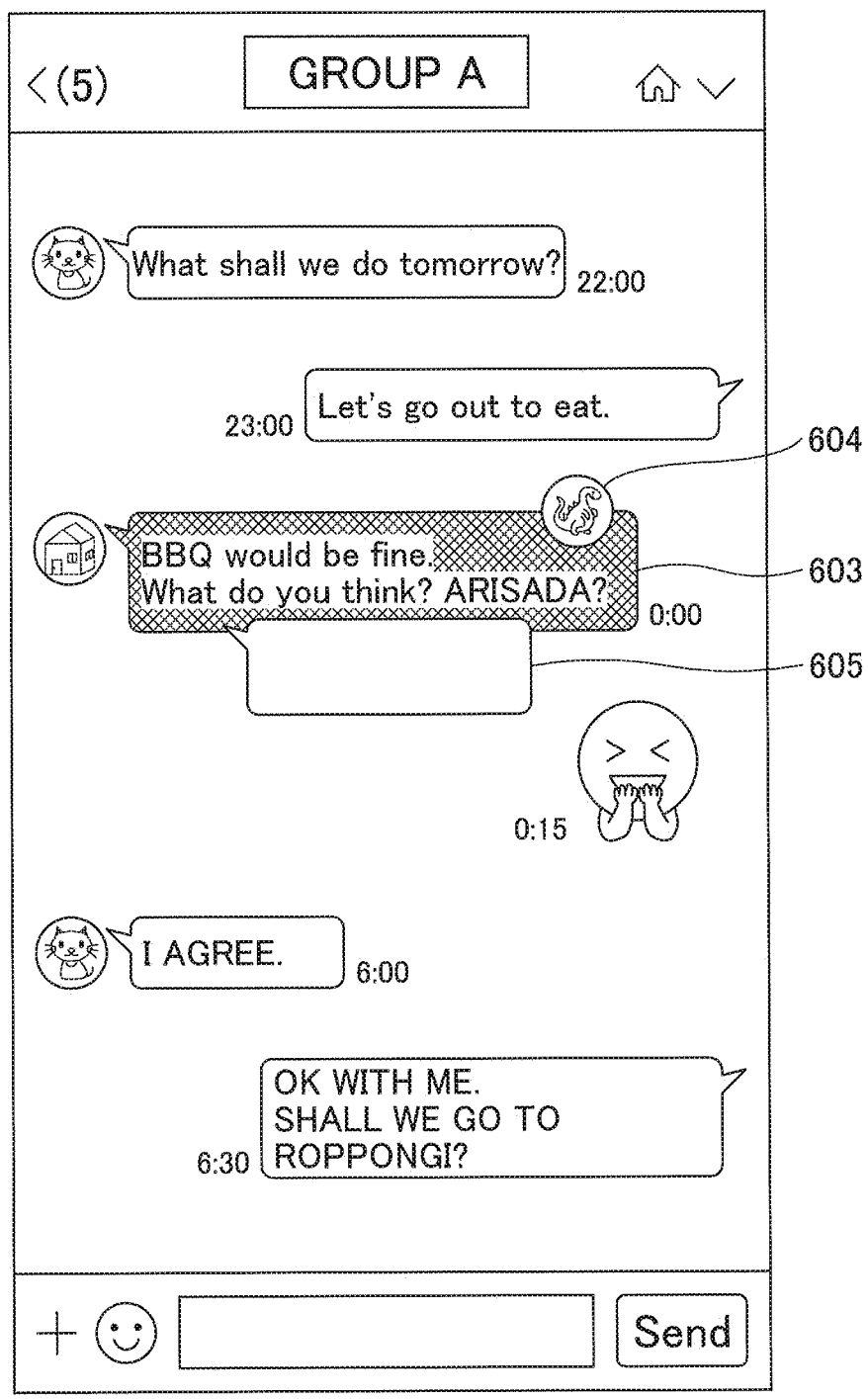
FIG. 14 is a diagram illustrating an example of a display screen of an additional content.

FIG. 14 is a diagram illustrating an example of a display screen of an additional content. In the example in FIG. 14, an additional content display area 605 is displayed in association with the content display area 603. This enables the user on the transmitting side of the mentioned content or the user on the receiving side of the mentioned content, to display (1) information that the user wants to notify when the content is viewed, or (2) a reply after having viewed the content in association with the content.

Fourth Modified Example

In a fourth modified example, when a predetermined (or alternatively desired) operation is received from the user on the terminal 20, only contents mentioned to the user of the host terminal 20 as the destination user are displayed (applied with filtering).

Figure 15:
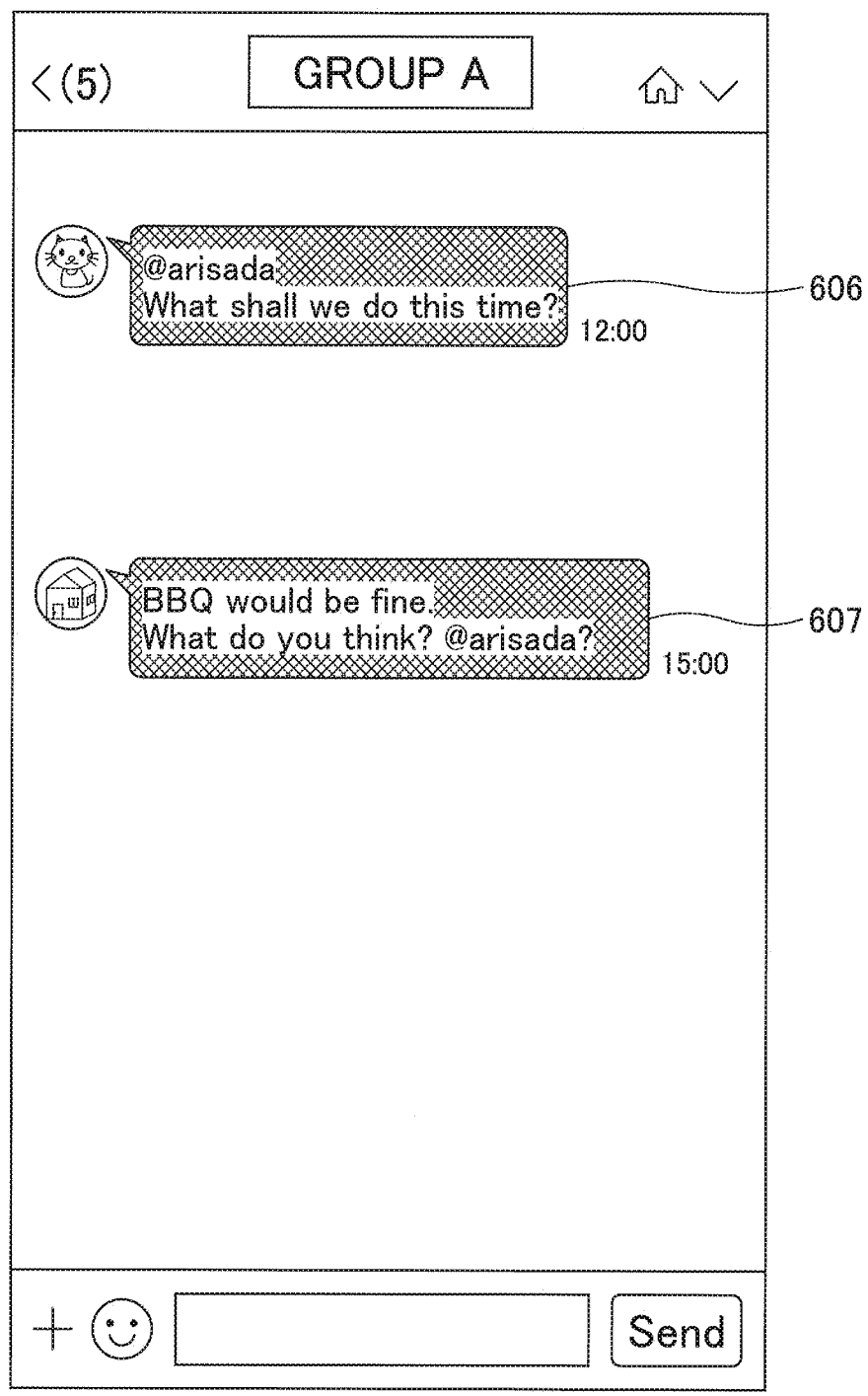
FIG. 15 is a diagram illustrating an example of a display screen of filtering.

FIG. 15 is a diagram illustrating an example of a display screen applied with filtering. In the example in FIG. 15, among contents transmitted and received in the talk room, only contents 606 and 607 mentioned to the user of the host terminal 20 as the destination user are displayed. Note that in this case, the additional content according to the third modified example described above may be displayed in association with the contents that have been mentioned.

<Other>

The candidate processor 220 may cause to a display operation on a first display area of the display area of the terminal 20. The communicator 240 may include a transmitter. The mention processor 250 may cause a display operation on a second display area of the display area of the terminal 20.

A recording medium storing a program code of software that implements functions of the example embodiments described above may be supplied to the terminal 20 and the server 10. Furthermore, it is needless to say that the example embodiments described above can be implemented by the terminal 20 and the server 10 that are capable of reading the program code stored in the recording medium, and executing the program code. In some example embodiments, a program that when executed, causes the terminal 20 and the server 10 to execute an information processing method described above may be stored in a non-transitory computer-readable recording medium.

At least a portion of the processes executed on the terminal 20 and the server 10 may be implemented by cloud computing constituted with one or more computers.

In some example embodiments, at least a portion of the processes executed on the terminal 20 may be executed on the server 10. For example, the candidate processor 220 and the mention processor 250 of the terminal 20 may be provided on the server 10, to cause the terminal 20 to display a result processed by the server 10.

The present inventive concepts have been described with reference to the drawings and example embodiments. Note that a person skilled in the art can easily make various transformations and modifications based on the present disclosure. Therefore, it should be noted that transformations and modifications are within in the scope of the present inventive concepts. For example, the functions or the like included in functional units, steps, and the like are relocatable as long as not introducing logical contradiction, and multiple functional units, steps, and the like can be combined into one entity, or can be further divided. Also, the elements described in the respective example embodiments may be appropriately combined.

What is claimed is:

1. A display method executed by a processor of a terminal that is configured to exchange contents with a plurality of users of a plurality of terminals in a chat room, the plurality of users of the plurality of terminals including a first terminal of a first user, the display method comprising:

associating, by the processor of the terminal, a second user name associated with the first user, the second user name being different from a first user name registered by the first user;

displaying, by the processor of the terminal, the chat room in a display area of the terminal;

displaying, by the processor of the terminal, a plurality of user names of the plurality of terminals, the plurality of user names including the second user name and a third user name in a first region of the chat room based on a first input by a user of the terminal, the third user name being associated with the second user of the second terminal;

deleting, by the processor of the terminal, the third user name in the first region of the chat room based on a second input that is a part of the second user name being input after the first input by the user of the terminal, the part of second user name being different from any part of the third user name;

displaying, by the processor of the terminal, first content in a second region of the chat room when the second user name is selected by the user of the terminal, the second region being different from the first region of the chat room, the first content including the second user name and indicating the first user associated with the second user name as a destination user of the first content; and transmitting, by the processor of the terminal, information related to the first content to the plurality of terminals, the information related to the first content including information for displaying second content in the chat room on the first terminal, the second content including second destination user information, the second destination user information including the first user name and indicating the first user associated with the first user name as a destination user of the second content.

2. The display method as claimed in claim 1, wherein the first content further includes first content information input by the user of the terminal, and
the second content further includes second content information input by the user of the terminal.

3. The display method as claimed in claim 1, wherein the second user name is selected by the first user who has been selected by the user of the terminal, and the first user is associated with the second user name displayed in the display area of the terminal.

4. The display method as claimed in claim 1, wherein,
in response to the second user of the second terminal associating the first user with third destination user information by the second terminal, and
the information related to the first content further includes information for displaying third content in a display area of the second terminal, the third content including the third destination user information, the third destination user information indicating the second user as a destination user of the third content.

5. The display method as claimed in claim 4, wherein a display mode of the second content displayed in a display area of the first terminal and a display mode of the third content displayed in the display area of the second terminal are different from each other.

6. The display method as claimed in claim 2, wherein the first input is an input of a symbol.

7. The display method as claimed in claim 1, wherein a display mode of the first content displayed in the display area of the terminal and a display mode of the second content displayed in a display area of the first terminal are different from each other.

8. The display method as claimed in claim 1, wherein the information related to the first content is transmitted to the plurality of terminals via a server.

9. The display method as claimed in claim 1, further comprising:
displaying a content transmitted from each of the plurality of terminals and the first content in a display area of the terminal in chronological order.

10. The display method as claimed in claim 1, wherein the second region of the chat room is an area in which a message is inout by the user of the terminal.

11. A display method executed by a system, the system comprising a terminal of a user and a first terminal of a first user and a second terminal of a second user, the terminal configured to exchange contents with a plurality of terminals including the first terminal and the second terminal, the user, the first user and the second user being included in a chat room, the display method comprising:
associating, by a processor of the terminal, a second user name associated with the first user, the second user name being different from a first user name registered by the first user;
displaying, by the processor of the terminal, the chat room in a display area of the terminal;
displaying, by the processor of the terminal, the second user name and third user name in a first region of the chat room based on a first input by the user of the terminal, the third user name, being associated with the second user of the second terminal;
deleting by the processor of the terminal, the third user name in the first region of the chat room based on a second input that is part of the second user name input after the first input by the user of the terminal, the part of second user name being different from any part of the third user name;
displaying, by the processor of the terminal, first content in a second region of the chat room when the second user name is selected by the user of the terminal, the second region being different from the first region of the chat room, when the second user name is selected by the user of the terminal, the second region being different from the first region of the chat room, the first content including first destination user information, the first destination user information including the second user name and indicating the first user associated with the second user name as a destination user of the first content;
transmitting, by the processor of the terminal, information related to the first content to the plurality of terminals, the information related to the first content including information for displaying second content in the chat room on the first terminal, the second content including second destination user information, the second destination user information including the first user name and indicating the first user associated with the first user name as a destination user of the second content;
receiving, by a processor of the first terminal, the information related to the first content; and
displaying, by the processor of the first terminal, the second content in a display area of the first terminal based on the received information related to the first content.

12. A non-transitory storage medium storing a program to be executed by a computer of a terminal that is configured to exchange contents with a plurality of terminals including a first terminal of a first user and a second terminal of a second user in a chat room, the program, when executed by the computer, causing the computer to perform operations comprising:
associating, by a computer of the terminal, second user name associated with the first user, the second user name being different from first user name registered by the first user;
displaying, by the processor of the terminal, the chat room in a display area of the terminal;
displaying, by the computer of the terminal, the second user name and third user name in a first region of the chat room based on a first input by a user of the terminal, the third user name being associated with the second user of the second terminal;
deleting, by the processor of the terminal, the third user name in the first region of the chat room based on a second input that is a part of the seond user name being input after the first input by the user of the terminal, the part of second user name being different from any part of the third user name;
displaying, by the computer of the terminal, first content in a second region of the chat room when the second user name is selected by the user of the terminal, the second region being different from the first region of the chat room, the first content including first destination user information, the first destination user information including the second user name and indicating the first user associated with the second user name as a destination user of the first content; and
transmitting, by the computer of the terminal, information related to the first content to the plurality of terminals, the information related to the first content including information for displaying second content in the chat room on the first terminal, the second content including second destination user information, the second destination user information including the first user name and indicating the first user associated with the first user name as a destination user of the second content.

13. The non-transitory storage medium as claimed in claim 12, wherein
the first content further includes first content information input by the user of the terminal, and
the second content further includes second content information input by the user of the terminal.

14. The non-transitory storage medium as claimed in claim 12, wherein
the second user name is selected by the first user who has been selected by the user of the terminal, and
the first user is associated with the second user name displayed in the display area of the terminal.

15. The non-transitory storage medium as claimed in claim 12, wherein
in response to the second user of the second terminal associating the first user with third destination user information by the second terminal, and
the information related to the first content further includes information for displaying third content in a display area of the second terminal, the third content including the third destination user information, the third destination user information indicating the second user as a destination user of the third content.

16. The non-transitory storage medium as claimed in claim 15, wherein a display mode of the second content displayed in a display area of the first terminal and a display mode of the third content displayed in the display area of the second terminal are different from each other.

17. The non-transitory storage medium as claimed in claim 13, wherein the first input is an input of a symbol.

18. The non-transitory storage medium as claimed in claim 12, wherein a display mode of the first content displayed in the display area of the terminal and a display mode of the second content displayed in a display area of the first terminal are different from each other.

19. The non-transitory storage medium as claimed in claim 12, wherein the information related to the first content is transmitted to the plurality of terminals via a server.

20. The non-transitory storage medium as claimed in claim 12, wherein the operations further comprise:
displaying a content transmitted from each of the plurality of terminals and the first content in the display area of the terminal in chronological order.

21. The non-transitory storage medium as claimed in claim 12, wherein
the second region of the chat room is an area in which a message is input by the user of the terminal.

22. A non-transitory storage medium storing a program to be executed by a computer of a system comprising a terminal and a first terminal of a first user and a second terminal of a second user, the terminal configured to exchange contents with a plurality of users of a plurality of terminals including the first user of the first terminal and a second user of the second terminal in a chat room, the program, when executed by the computer, causing the computer to perform operations comprising:
associating, by a processor of the terminal, a second user name associated with the first user, the second user name being different from a first user name regiesterd by the first user;
displaying, by the processor of the terminal, the chat room in a display area of the terminal;
displaying, by the processor of the terminal, the second user name and third user name in a first region of the chat room based on input by the user of the terminal, the third user name being associated with the second user of the second terminal;
deleting, by the processor of the terminal, the third user name in the first region of the chat room based on a second input that is a part of the second user name input after the first inout by the user of the terminal, the part of second user name being different from any part of the third user name;
displaying, by the processor of the terminal, first content in a second region of the chat room when the second user name is selected by the user terminal, the second region being diffent from the first region of the chat room, the first content including first destination user information, the first destination user information including the second user name and indicating the first user associated with the second user name as a destination user of the first content;
transmitting, by the processor of the terminal, information related to the first content to the plurality of terminals, the information related to the first content including information for displaying second content in the chat room on the first terminal, the second content including second destination user information, the second destination user information including the first user name and indicating the first user associated with the first as a destination user of the second content;
receiving, by a processor of the first terminal, information related to the first content, the computer including the processor of the first terminal; and
displaying, by the processor of the first terminal, the second content in a display area of the first terminal based on the received information related to the first content.

* * * * *